(12) United States Patent
Nishio

(10) Patent No.: US 7,158,320 B2
(45) Date of Patent: Jan. 2, 2007

(54) OPTICAL SYSTEM AND IMAGE PICKUP APPARATUS INCLUDING THE SAME

(75) Inventor: Akihiro Nishio, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/150,456

(22) Filed: Jun. 10, 2005

(65) Prior Publication Data

US 2005/0275947 A1  Dec. 15, 2005

(30) Foreign Application Priority Data

Jun. 11, 2004 (JP) ............................. 2004-174057

(51) Int. Cl.
  *G02B 9/00* (2006.01)
  *G02B 9/04* (2006.01)
(52) U.S. Cl. ...................... 359/796; 359/793
(58) Field of Classification Search ................ 359/642, 359/793–796
  See application file for complete search history.

(56) References Cited

U.S. PATENT DOCUMENTS

| 4,913,535 | A | 4/1990 | Robb |
| 5,872,658 | A | 2/1999 | Ori |
| 6,404,561 | B1 | 6/2002 | Isono et al. |
| 6,594,087 | B1 | 7/2003 | Uzawa et al. |
| 6,717,749 | B1 * | 4/2004 | Abe ........................... 359/796 |
| 6,759,471 | B1 | 7/2004 | Ukuda |
| 7,088,521 | B1 * | 8/2006 | Hamano et al. ............ 359/686 |

FOREIGN PATENT DOCUMENTS

| EP | 1 065 531 A3 | 1/2002 |
| JP | 8-248317 A | 9/1996 |
| JP | 9-211329 A | 8/1997 |
| JP | 3097399 B2 | 8/2000 |
| JP | 2001-21803 A | 1/2001 |
| JP | 2001-74901 A | 3/2001 |
| JP | 2001-74901 A5 | 3/2001 |
| JP | 2001-194590 A | 7/2001 |
| JP | 2002-62478 A | 2/2002 |

* cited by examiner

*Primary Examiner*—Ricky Mack
*Assistant Examiner*—William Choi
(74) *Attorney, Agent, or Firm*—Morgan & Finnegan, L.L.P.

(57) ABSTRACT

Disclosed is an optical system in which an adhesive layer of a cemented lens is made of a mixture in which inorganic fine particles dispersed into a transparent medium. Therefore, there is realized an optical system capable of effectively correcting chromatic aberration while having a structure in which a manufacturing cost is low and an environmental resistance is high.

12 Claims, 18 Drawing Sheets

FIG. 6A

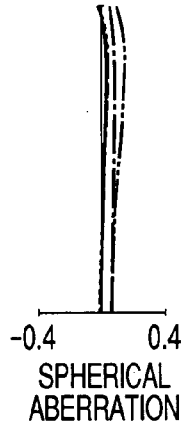

f=103.35

— d-LINE
—··— g-LINE
—·— C-LINE
----- F-LINE
······ S.C

——— ΔS
········ ΔM

—··— g-LINE
—·— C-LINE
----- F-LINE

Fno=4.65   ω=11.82°   ω=11.82°   ω=11.82°

SPHERICAL ABERRATION | ASTIGMATISM | DISTORTION (%) | CHROMATIC ABERRATION OF MAGNIFICATION

FIG. 6B

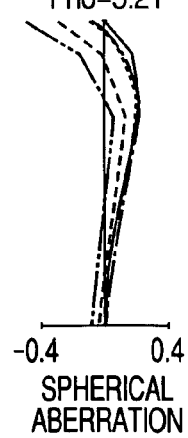

f=173.68

— d-LINE
—··— g-LINE
—·— C-LINE
----- F-LINE
······ S.C

——— ΔS
········ ΔM

—··— g-LINE
—·— C-LINE
----- F-LINE

Fno=5.21   ω=7.10°   ω=7.10°   ω=7.10°

SPHERICAL ABERRATION | ASTIGMATISM | DISTORTION (%) | CHROMATIC ABERRATION OF MAGNIFICATION

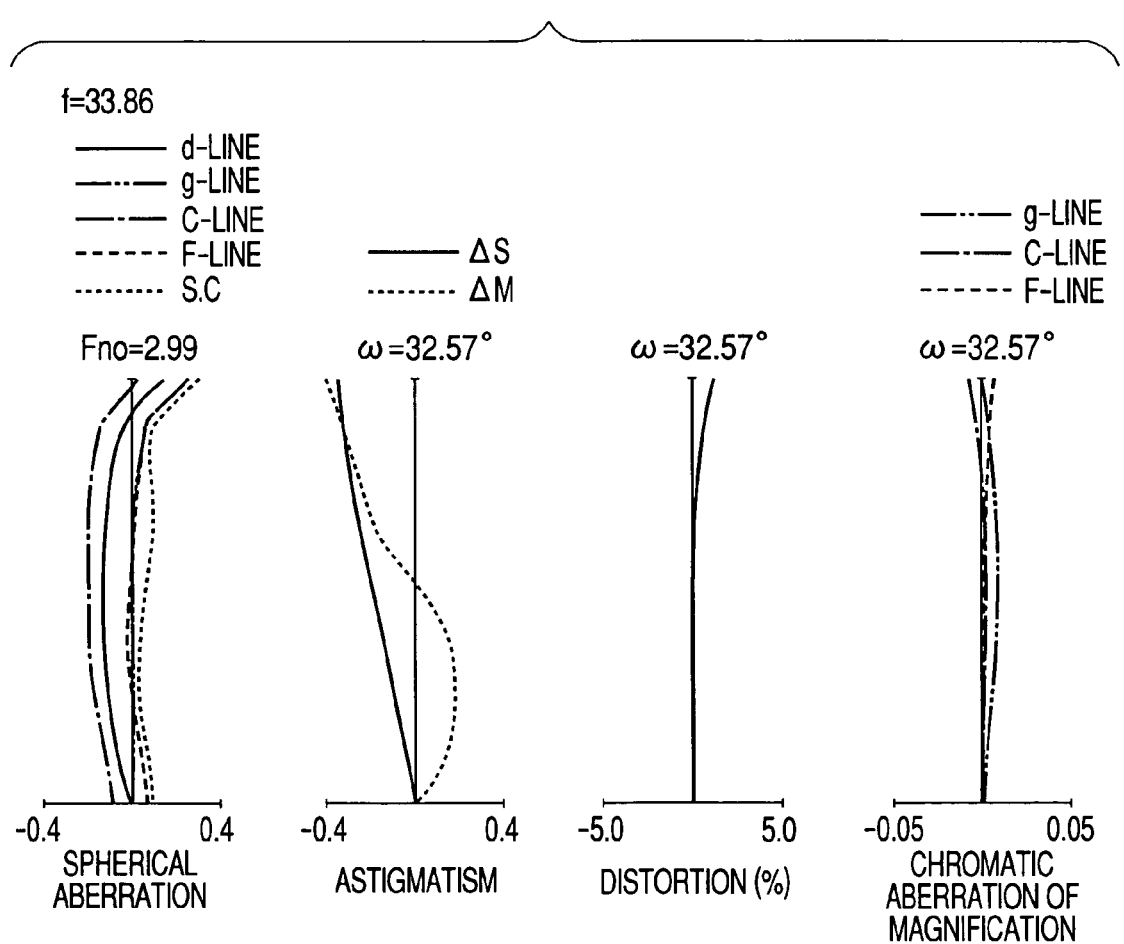

OPTICAL SYSTEM AND IMAGE PICKUP APPARATUS INCLUDING THE SAME

BACKGROUND OF THE INVENTION

1. Field of the Invention

The present invention relates to an optical system using an optical material having extraordinary partial dispersion, and more particularly, to an optical system suitable for use in a photographing optical system for a silver-halide film camera, a digital still camera, or a video camera, or to an optical system suitable for use in a projection optical system for a liquid crystal projector.

2. Related Background Art

With an increase in high resolution of a digital still camera, it is necessary for a photographing lens for image formation in the digital still camera to sufficiently correct color blurring in a white light or aberration related to chromatic aberration which influences the resolution of an image, in addition to the correction of aberration related to image performance in monochrome, such as spherical aberration or comatic aberration.

In general, in order to expand a photographing region, a zoom lens having a higher zoom ratio or a lens for obtaining a super wide-angle view field or a super telephoto view field is strongly desired as the photographing lens. However, in particular, when a focal length of the photographing lens is increased to improve telephotographing, it becomes an important factor to correct chromatic aberration (axial chromatic aberration) with respect to not only a primary spectrum but also a secondary spectrum in order to obtain high quality image performance.

As regards the super wide-angle photographing lens, it is necessary to obtain a strong retrofocal action, in particular, in the case where a single-lens reflex camera which requires a back focus longer than the focal length is used or the case where a digital still camera having a solid-state image pickup element which requires a telecentric characteristic in an image side is used. In the photographing lens having the strong retrofocal action, symmetry is lost, with the result that large chromatic aberration of magnification is caused. Therefore, it is important to correct such chromatic aberration of magnification.

Up to now, it has been known that a lens made of extraordinary dispersion glass is disposed in an optical system in order to correct a secondary spectrum of the chromatic aberration.

Examples in which glass having an extraordinary dispersion property is used for a zoom lens are described in Japanese Patent No. 3097399, Japanese Patent Application Laid-Open Nos. 2002-062478 (corresponding to U.S. Pat. No. 6,594,087), H08-248317, and 2001-194590 (corresponding to U.S. Pat. No. 6,404,561). The zoom lens includes four lens units, that is, a lens unit having a positive refractive power, a lens unit having a negative refractive power, a lens unit having a positive refractive power, and a lens unit having a positive refractive power, in order from an object side.

An example in which a diffractive optical element having a chromatic aberration correcting effect better than that of an extraordinary dispersion glass material is used for a zoom lens is described in Japanese Patent Application Laid-Open No. H09-211329 (corresponding to U.S. Pat. No. 5,872,658).

A liquid material which is relatively high dispersion and indicates a relatively extraordinary partial dispersion property has been known as a material having a chromatic aberration correcting action similar to that of a diffractive optical element. An apochromatic optical system that uses the liquid material has been proposed in U.S. Pat. No. 4,913,535.

In order to improve diffractive efficiency, it has been proposed in Japanese Patent Application Laid-Open No. 2001-074901 (corresponding to EP 1 065 531 A3) to use a replica material, obtained by mixing ITO fine particles into a resin, for a diffractive grating.

An example in which an aspherical surface made of a resin layer is provided in a first lens unit to correct monochromatic aberration has been known in Japanese Patent Application Laid-Open No. 2001-021803.

When the diffractive optical element is used for the zoom lens, the chromatic aberration correcting effect larger than that of the extraordinary dispersion glass material is obtained. However, the diffractive efficiency of the diffractive grating depends on an incident angle of a light beam. Therefore, when the zoom lens is used in a condition in which an incident condition of the light beam changes during zooming, an installation position of the diffractive optical element may be limited or the diffractive efficiency according to a zoom position may be reduced.

A method of forming an ultraviolet curing resin or the like using a metal mold has been known as a method of manufacturing the diffractive optical element. However, the diffraction optical element has extremely high manufacturing sensitivity with respect to the diffraction efficiency, so very high mold precision and very high formation precision are required. Therefore, there is also a problem in that a manufacturing cost is high at the current moment.

The material disclosed in U.S. Pat. No. 4,913,535 is a liquid, so a structure for sealing the liquid is required and cannot be easily manufactured. There is also a problem with respect to changes in characteristics such as a refractive power and a dispersion characteristic, which are caused by a variation in temperature, so an environmental resistance is insufficient. Further, it is hard to obtain a sufficient chromatic aberration correcting action because the Abbe number is relatively large, an extraordinary partial dispersion property is relatively small, and an interface with air is not obtained.

When an aspherical surface is made of a normal resin material disclosed in Japanese Patent Application Laid-Open No. 2001-074901 (corresponding to EP 1 065 531 A3), the chromatic aberration correcting effect cannot be obtained.

SUMMARY OF THE INVENTION

The present invention has been made in view of the above-mentioned problems of the conventional examples. An object of the present invention is to realize an optical system capable of effectively correcting chromatic aberration while having a structure in which a manufacturing cost is low and an environmental resistance is high.

In an illustrated optical system of the present invention, a specific material is used for an adhesive layer of a cemented lens. A specific example is that the adhesive layer of the cemented lens in the optical system is made of a mixture in which inorganic fine particles satisfying the following conditions are dispersed into a transparent medium, $10 < \nu IT < 27$, $0.3 < \theta IT < 0.7$, where νIT denotes the Abbe number of the mixture and θIT denotes a partial dispersion ratio of the mixture with respect to a g-line and an F-line.

BRIEF DESCRIPTION OF THE DRAWINGS

FIGS. 6A, 6B, and 6C are graphs showing various aberrations of the optical system according to Embodiment 3 of the present invention;

FIGS. 8A, 8B, and 8C are graphs showing various aberrations of the optical system according to Embodiment 4 of the present invention;

DETAILED DESCRIPTION OF THE PREFERRED EMBODIMENTS

According to the present invention, a solid material having high dispersion and a low partial dispersion ratio is used for an adhesive layer of a cemented lens, to thereby realize an optical system in which chromatic aberration is preferably corrected. Used as an example of the solid material having the high dispersion and the low partial dispersion ratio is a material in which an inorganic fine particle having an Abbe number νd of 15 or less (in particular, a particle diameter is preferably equal to or shorter than 1/20 of an incident light wavelength) is mixed into a transparent medium such as a synthetic resin.

Examples of the inorganic fine particle material dispersed into the synthetic resin include inorganic oxide fine particles such as $TiO_2$ (nd=2.2652 and νd=11.8), $Nb_2O_5$ (nd=2.367 and νd=14.0), ITO (nd=1.8581 and νd=5.53), $Cr_2O_3$ (nd=2.2178 and νd=13.4), and $BaTiO_3$ (nd=2.4362 and νd=11.3).

Of those materials, the indium tin oxide (ITO) is preferable because it has particularly a smaller Abbe number than other materials.

Figure 13A:
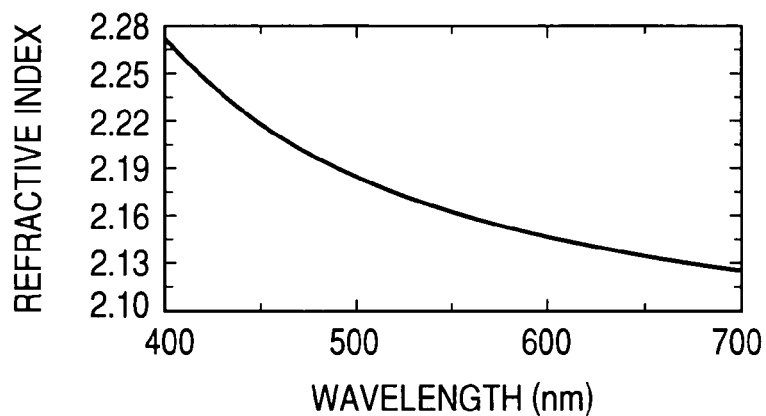
FIGS. 13A, 13B, and 13C are schematic explanatory graphs showing a feature of a dispersion characteristic of an ITO.
Figure 13B:
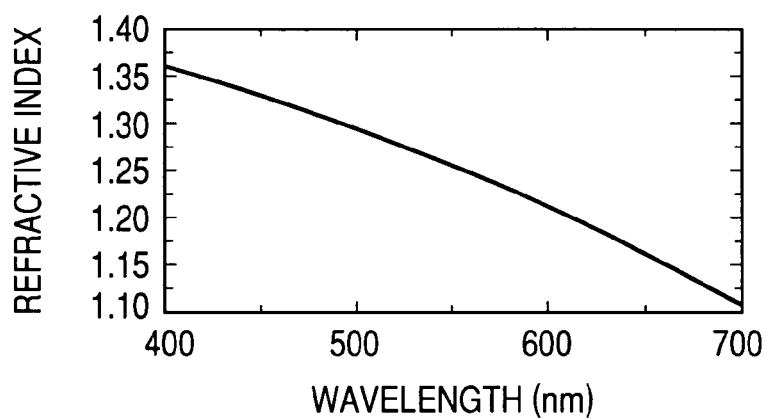
Figure 13C:
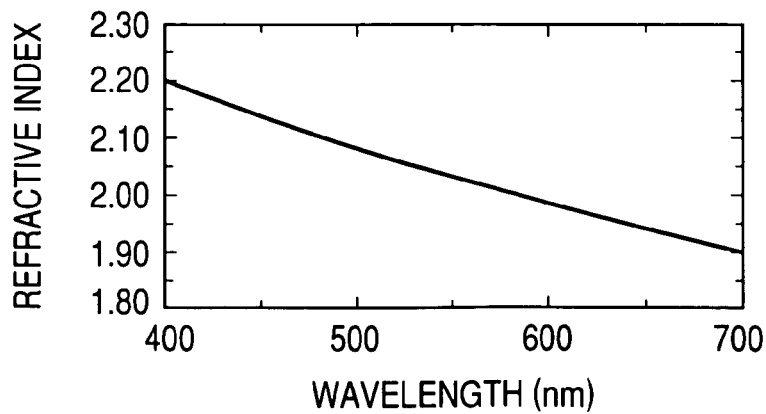

In the case of ITO, unlike a normal material, free carriers caused by electroconductivity influence a refractive index. A dispersion characteristic of the ITO (FIG. 13C) is produced by a change in refractive index in a short wavelength region, which is caused due to normal electron transition (FIG. 13A), combined with refractive index dispersion in an infrared region which is caused by the free carriers (FIG. 13B). As a result, the dispersion characteristic has wavelength dependence with an extraordinarily large gradient in which the Abbe number is 5.53.

Refractive index dispersion due to the electron transition (FIG. 13A) significantly changes on the short wavelength side in the visible region. On the other hand, the refractive index dispersion caused by the free carriers (FIG. 13B) significantly changes on the long wavelength side in the visible region. Therefore, the partial dispersion ratio becomes smaller than that in a normal case by a combination of the two changes.

Examples of a material which is transparent and likely to be influenced by the free carriers include $SnO_2$, ATO ($SnO_2$ doped with antimony), and ZnO.

The ITO is known as a material for forming a transparent electrode and generally used for a liquid crystal display element, an electroluminescent (EL) element, and the like. With respect to other applications, the ITO is used for an infrared shielding element and an ultraviolet shielding element. In the conventionally known applications of the ITO, its thickness is limited to a range of 50 nm to 500 nm. Therefore, there has been no example in which the mixture of fine particles is used to correct the chromatic aberration of the optical system.

An average diameter of the ITO fine particle is preferably about 2 nm to 50 nm in view of the influences of scattering and the like. A dispersant or the like may be added in order to suppress aggregation.

A medium material for dispersing the ITO is preferably a monomer. High mass productivity can be obtained by photo polymerization formation or thermal polymerization formation using a molding tool or the like.

With respect to optical constant characteristics of the monomer, it is preferable to use a monomer having a relatively small Abbe number, a monomer having a relatively small partial dispersion ratio, and a monomer satisfying both. More specifically, examples of such a monomar include N-polyvinylcarbazole, styrene, and polymethyl methacrylate (acrylic).

A dispersion characteristic N(λ) of a mixture in which nano-fine particles are dispersed can be simply calculated using the following expression derived from Drude's formula which is well known. That is, $$N(\lambda)=[1+V\{N_{ITO}^2(\lambda)-1\}+(1-V)\{N_P^2(\lambda)-1\}]^{1/2} \quad (a)$$

where λ indicates an arbitrary wavelength, $N_{ITO}$ indicates a refractive index of ITO, $N_P$ indicates a refractive index of polymer, and V indicates a fraction of an ITO fine particle total volume to a polymer volume.

In embodiments of the present invention, a material in which the ITO fine particles are dispersed into the adhesive layer of the cemented lens in the optical system is used as a means for further improving the chromatic aberration correcting effect described above.

For example, assume that an ultraviolet curing agent is added to a resin of polyvinylcarbazole, and the ITO fine particles are mixed with the resin of polyvinylcarbazole to be used as an adhesive material. When the ITO fine particles are mixed into the polyvinylcarbazole at 20%, a characteristic of νd=12.55 and θgf=0.518 is obtained with respect to Nd=1.6959. In the case of S-TIH53 (produced by Ohara Inc.) which is a normal glass material and has large dispersion, νd=23.8 and θgf=0.62. Therefore, it is apparent that a mixture material of the ITO fine particles has a more distinctive characteristic. In particular, since a very small θgf is obtained, it is very effective to improve chromatic aberration, in particular, a secondary spectrum thereof. Letting νd and θgf be the Abbe number and the partial dispersion ratio, respectively, and Ng, NF, Nd, and NC be refractive factors of the mixture material with respect to a g-line, an F-line, a d-line, and a C-line, respectively, the relationship between them are defined by the following express-ions.

$$\nu d=(Nd-1)/(NF-NC) \tag{b}$$

$$\theta gF=(Ng-NF)/(NF-NC) \tag{c}$$

When a mixing ratio of the ITO increases, the extraordinary dispersion effect becomes larger. However, transmittance reduces at the same time. Therefore, it is undesirable to increase the mixing ratio to a certain level or more, or to thicken the adhesive layer.

A lens in which a lens component having a positive refractive power is bonded to a lens component having a negative refractive power to wholly obtain a positive refractive power may be used as the cemented lens that are bonded to each other through the adhesive layer according to the present invention. In this case, the chromatic aberration can be corrected up to a point by having the plurality of lens components work together. Therefore, even when a negative refractive power provided for the adhesive layer is small, it is possible to expect a sufficient chromatic aberration correcting effect, so a thickness of the adhesive layer can be reduced.

It is desirable that the adhesive layer made of a material in which the inorganic fine particles are mixed into the transparent medium as used in embodiments of the present invention, satisfy the following condition in order to effectively correct the chromatic aberration, $$\nu d1 > \nu d2,$$

where νd1 represents an Abbe number of the lens component to be cemented which has the negative refractive power, and νd2 represents an Abbe number of the adhesive layer.

Further, the adhesive layer satisfies the following conditions, $$8<\nu IT<27 \tag{1},$$

$$0.3<\theta IT<0.7 \tag{2},$$

where νIT and θIT represent an Abbe number and a partial dispersion ratio of the material composing the adhesive layer, respectively.

Note that νd1, νd2, and νIT each indicate the Abbe number based on the d-line defined by the expression (b), and θIT indicates the partial dispersion ratio with respect to the g-line and the F-line which is defined by the expression (c).

When the Abbe number is reduced to a value smaller than the lower limit of the conditional expression (1), it is necessary to increase a mixing ratio of the inorganic fine particle. Therefore, the transmittance reduces or the extraordinary dispersion effect becomes so large that the chromatic aberration is excessively corrected. On the other hand, when the Abbe number is greater than the upper limit of the conditional expression (1), the chromatic aberration correcting effect becomes insufficient.

It is not preferable that the partial dispersion ratio be reduced to a value smaller than the lower limit of the conditional expression (2), because it is necessary to increase the mixing ratio of the inorganic fine particles, and as a result, the transmittance reduces or the chromatic aberration is excessively corrected. On the other hand, it is not preferable that the partial dispersion ratio exceed the upper limit of the conditional expression (2), because the chromatic aberration correcting effect becomes insufficient.

In order to establish a more preferable relationship between the chromatic aberration correcting condition and the transmittance, it is further preferable that the conditional expressions (1) and (2) be in the following numerical ranges.

$$10<\nu IT<16 \tag{1a}$$

$$0.4<\theta IT<0.6 \tag{2a}$$

In order to obtain an effective chromatic aberration correcting effect without a significant increase in thickness of the adhesive layer, it is preferable to satisfy the following condition, $$1<Fs/|Fit|<0.04 \tag{3}$$

where Fit<0, Fs>0, Fit represents a focal length of the adhesive layer in air (focal length in the case where each of interfaces is air), and Fs represents a focal length of the cemented lens.

It is not preferable that Fs/|Fit| exceeds the upper limit of the conditional expression (3), because the negative refractive power of the adhesive layer becomes so large that the thickness of the adhesive layer having a concave lens shape at the lens peripheral portion increases, which leads to reduce the transmittance. On the other hand, when Fs/|Fit| is reduced to a value smaller than the lower limit of the conditional expression (3), the negative refractive power of the adhesive layer becomes too small. Therefore, it is hard to obtain a sufficient chromatic aberration correcting effect.

Embodiments

Examples of an optical system having the cemented lens using an adhesive composed of a mixture in which inorganic fine particles are dispersed into a transparent medium will be described. Each of optical systems described below is assumed to be an interchangeable lens for single-lens reflex camera.

FIGS. 1, 3, 5, 7, 9, and 11 are lens sectional views showing optical systems according to Embodiments 1 to 6. FIGS. 2, 4, 6A to 6C, 8A to 8C, 10A to 10C, and 12A to 12C are graphs showing various aberrations of the optical systems according to the respective embodiments.

In the respective lens sectional views, ITO denotes the adhesive layer composed of the mixture in which ITO fine particles serving as the inorganic fine particles are dispersed into polyvinylcarbazole serving as the transparent medium. SP denotes an aperture stop (iris stop), FP denotes a fixed flare cut stop, and SSP denotes a sub-flare cut stop which is moved during zooming and has a changeable diameter. IP denotes an image plane on which a silver-halide film or a photosensitive surface of a solid-state image pickup element (photoelectric transducer) such as a CCD sensor or CMOS sensor is disposed. L1 to L5 denote lens units composing a zoom lens.

In the respective aberration graphs, Fno denotes an F number and ω denotes a half view angle. In addition, d-LINE, g-LINE, C-LINE, and F-LINE denote chromatic aberrations with respect to the d-line, the g-line, the C-line, and the F-line. S.C denotes a sine condition. Further, ΔS denotes a state on a sagittal image plane, and ΔM denotes a state on a meridional image plane.

Figure 1:
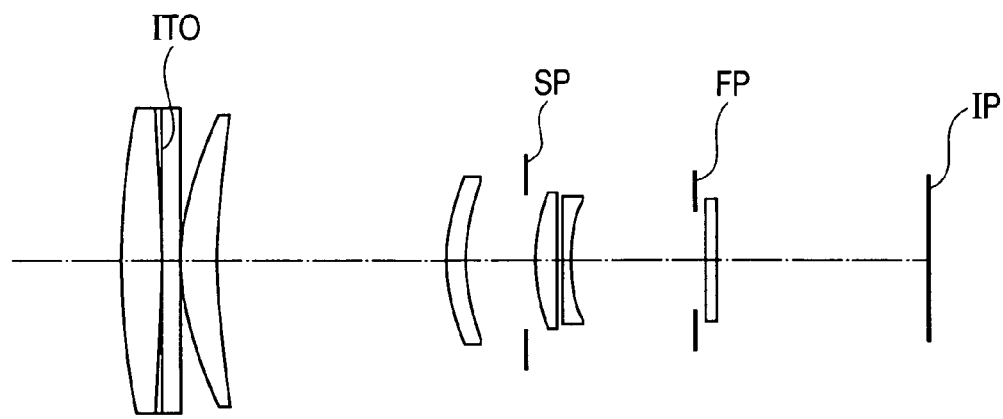
FIG. 1 is a lens sectional view showing an optical system according to Embodiment 1 of the present invention.
Figure 2:
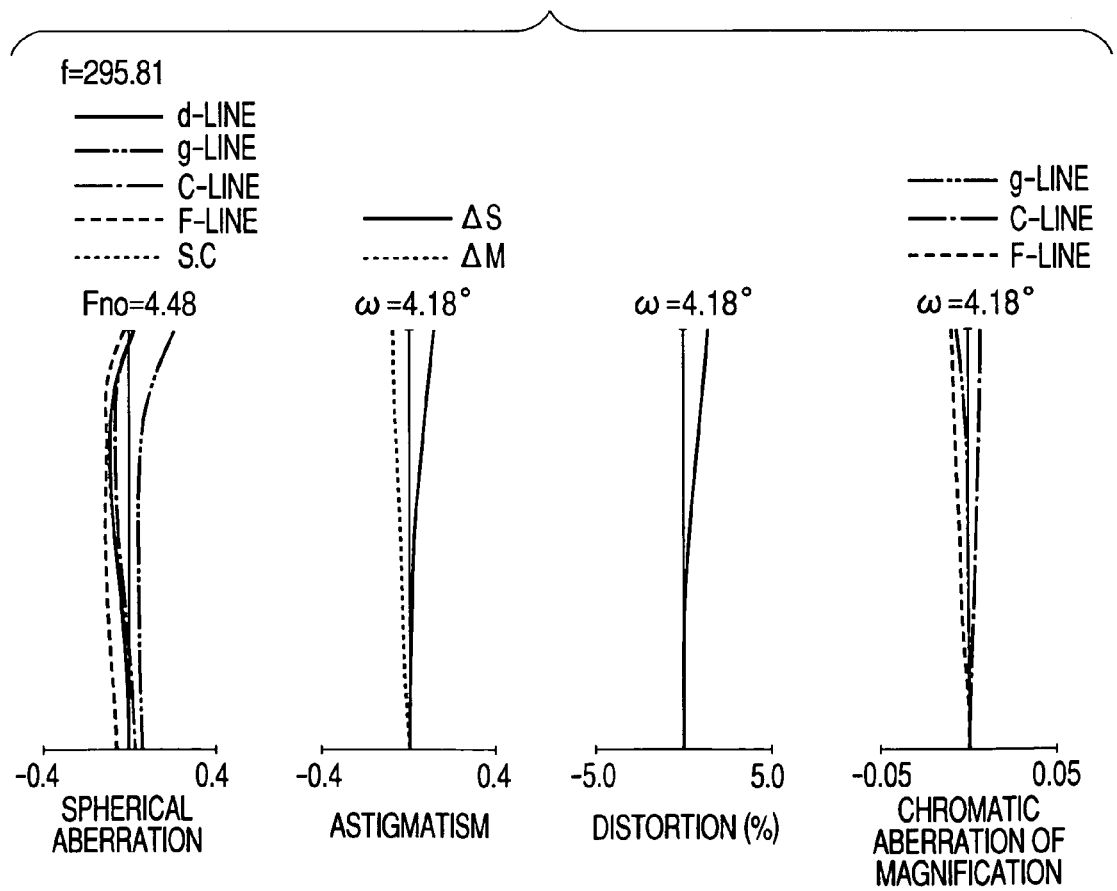
FIG. 2 is a graph showing various aberrations of the optical system according to Embodiment 1 of the present invention.

In Embodiment 1 shown in FIG. 1, an adhesive into which the ITO fine particles are mixed is used for the cemented lens of a telephoto lens. In Embodiment 1, as an adhesive material for the cemented lens which is located closest to an object side and has a positive refractive power, polyvinylcarbazole into which the ITO fine particles are mixed at 10% is used.

Figure 3:
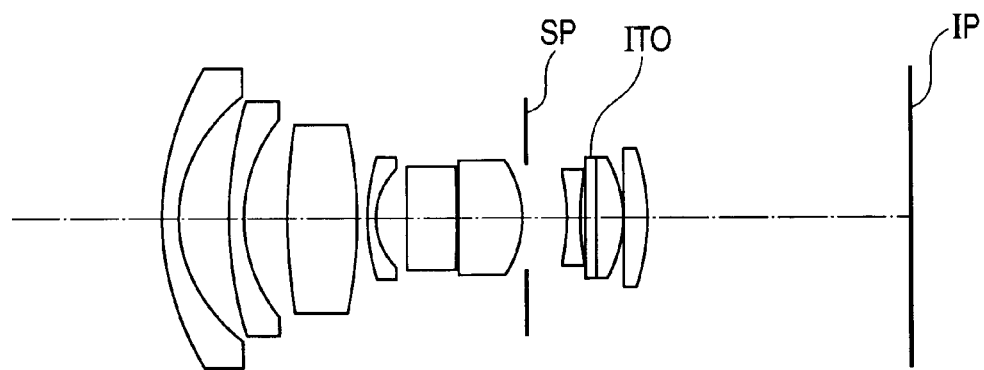
FIG. 3 is a lens sectional view showing an optical system according to Embodiment 2 of the present invention.
Figure 4:
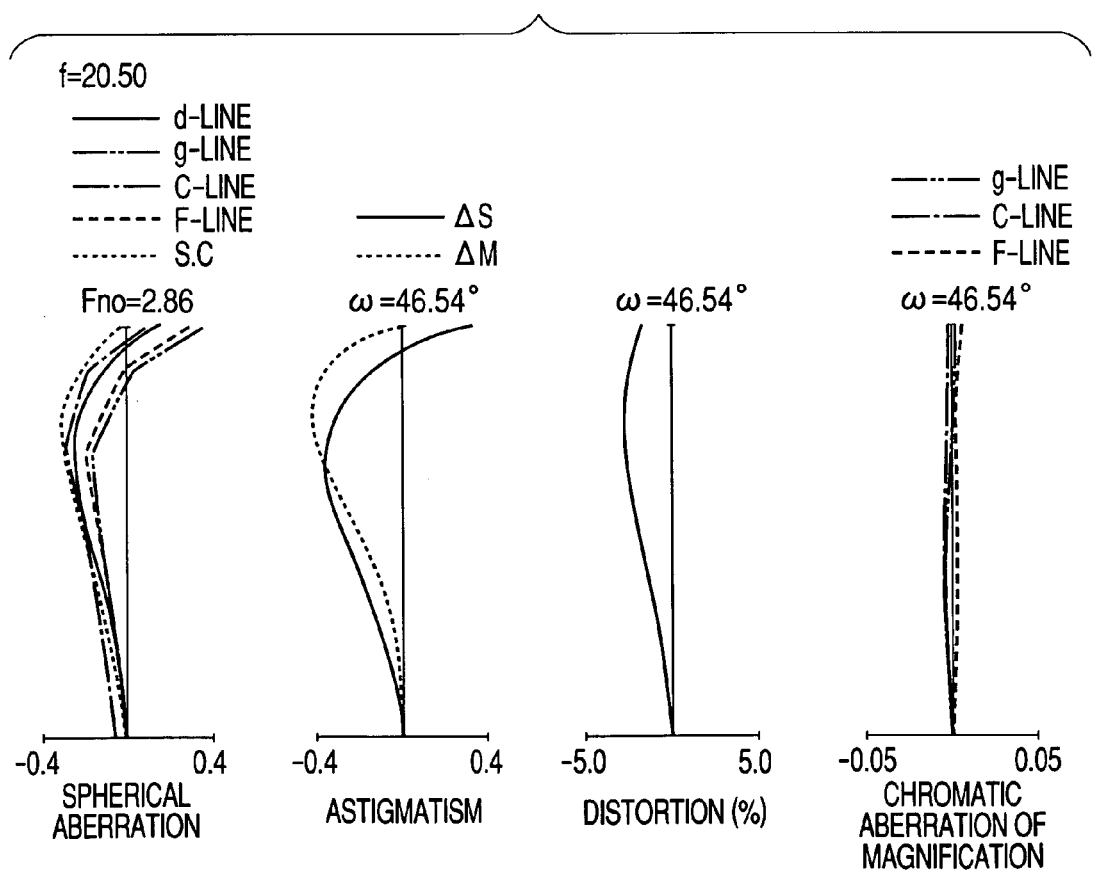
FIG. 4 is a graph showing various aberrations of the optical system according to Embodiment 2 of the present invention.
Figure 5:
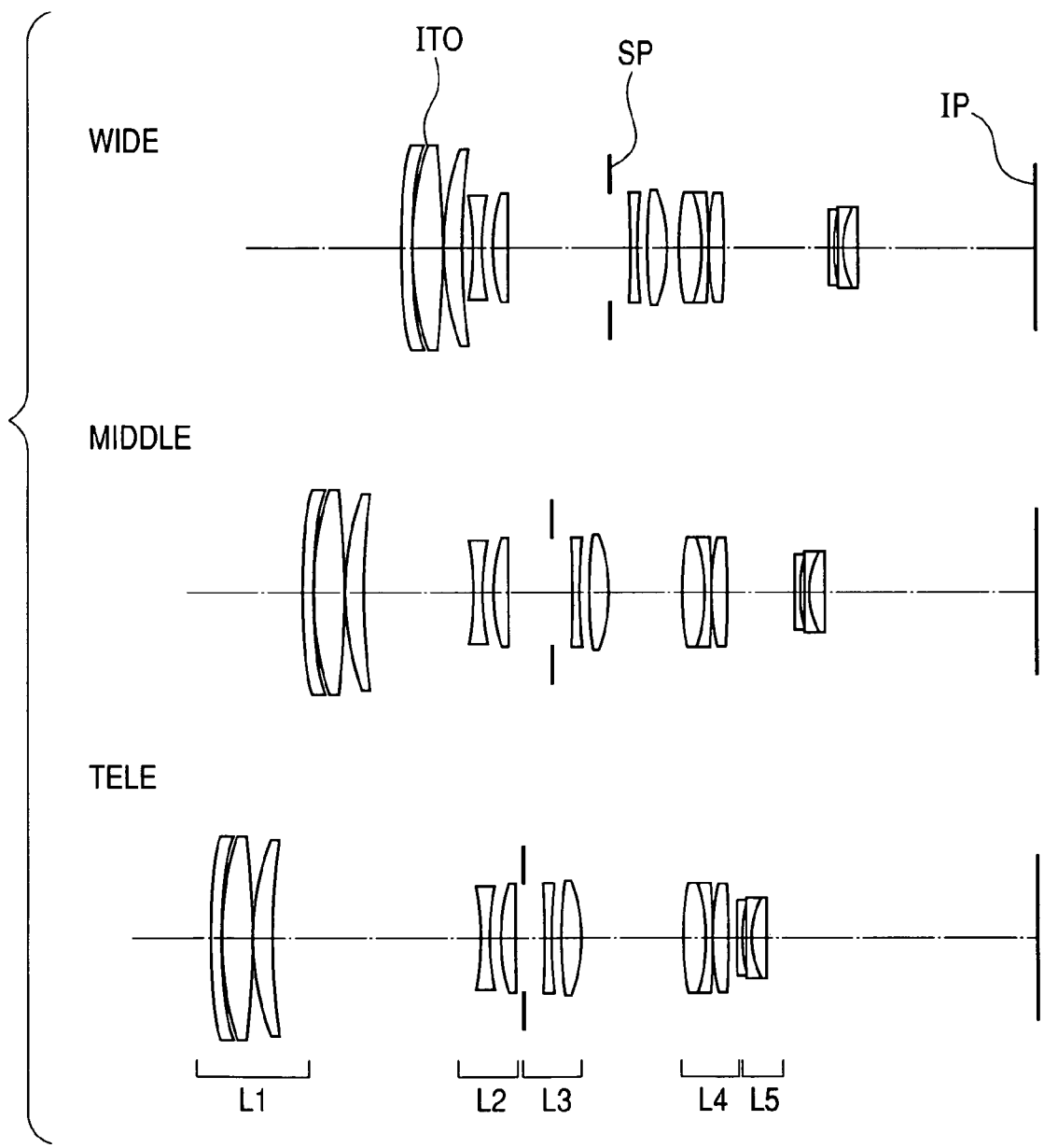
FIG. 5 is a lens sectional view showing an optical system according to Embodiment 3 of the present invention.
Figure 6C:
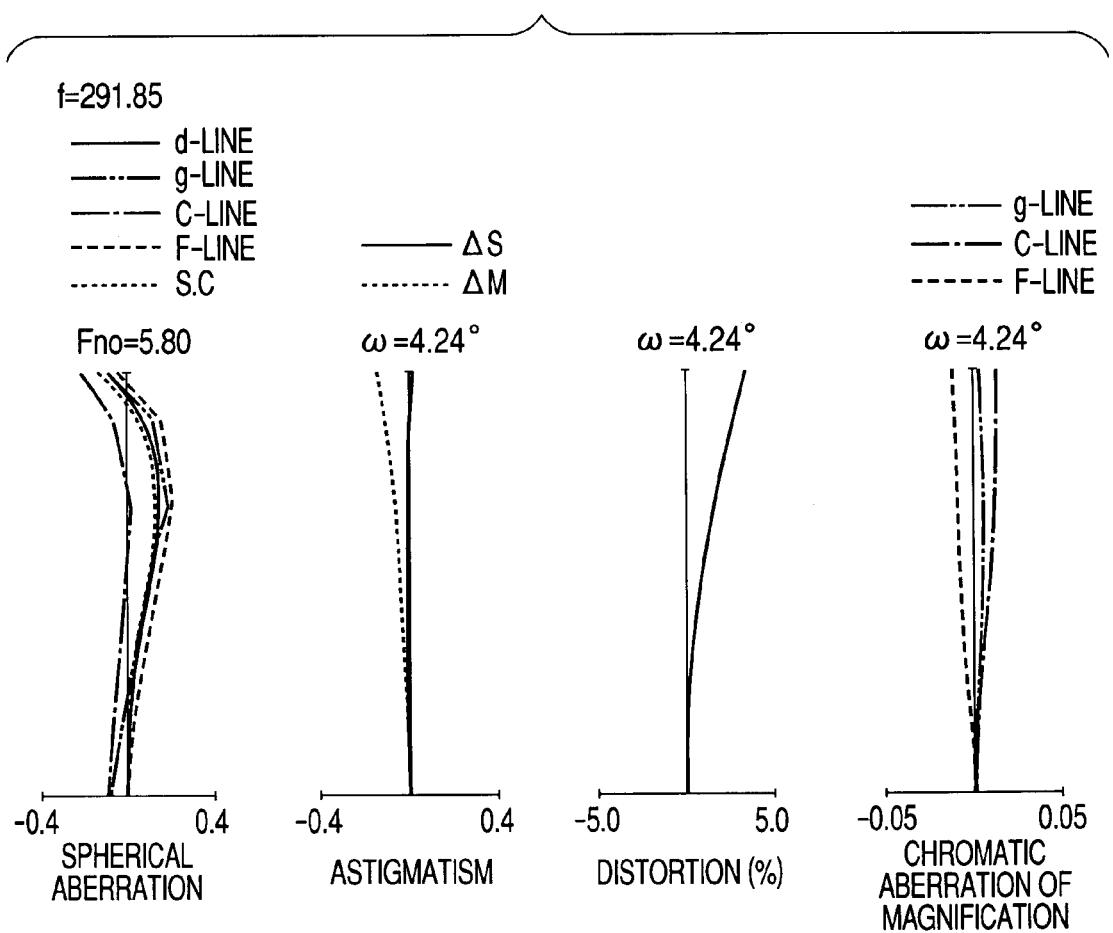
Figure 7:
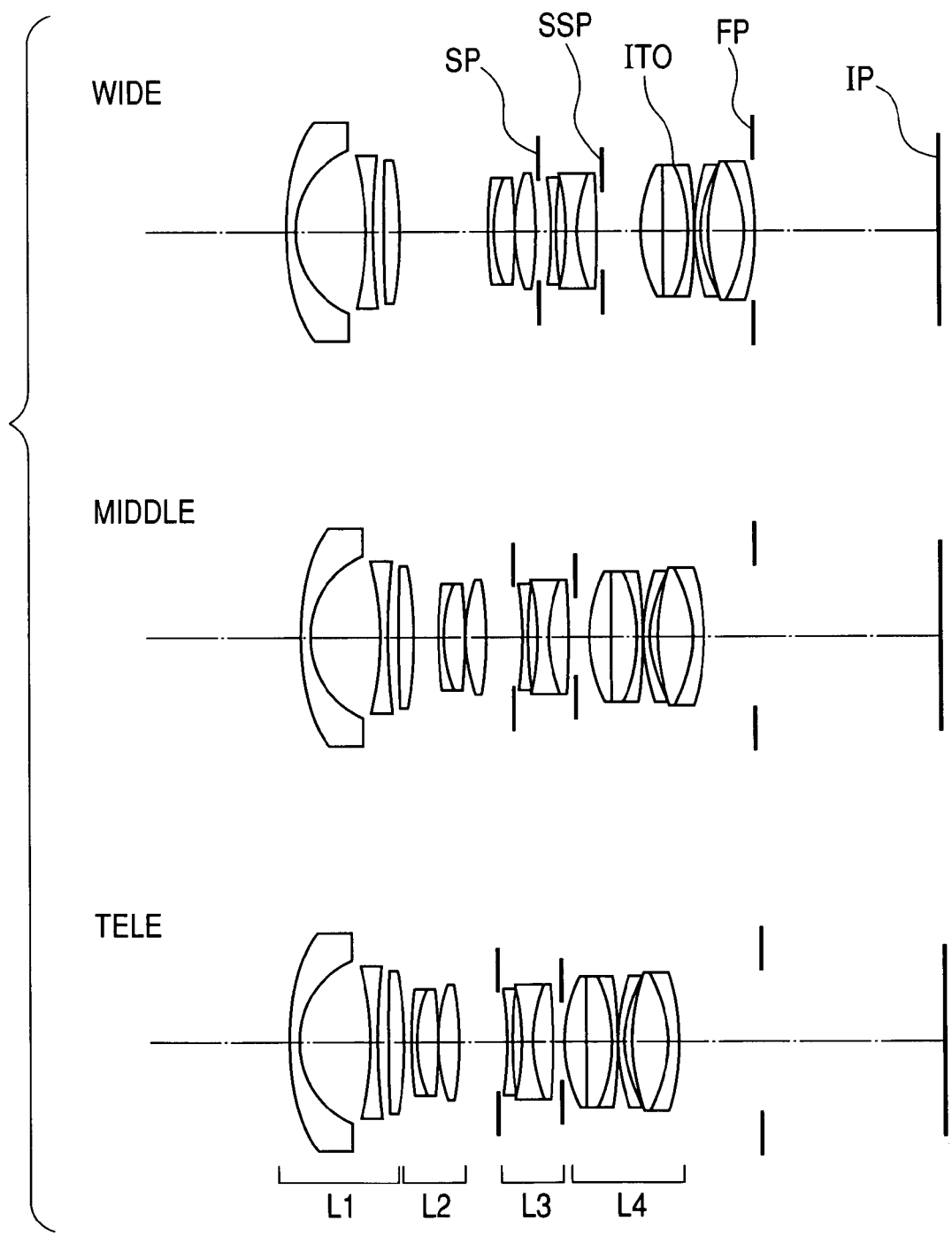
FIG. 7 is a lens sectional view showing an optical system according to Embodiment 4 of the present invention.
Figure 8A:
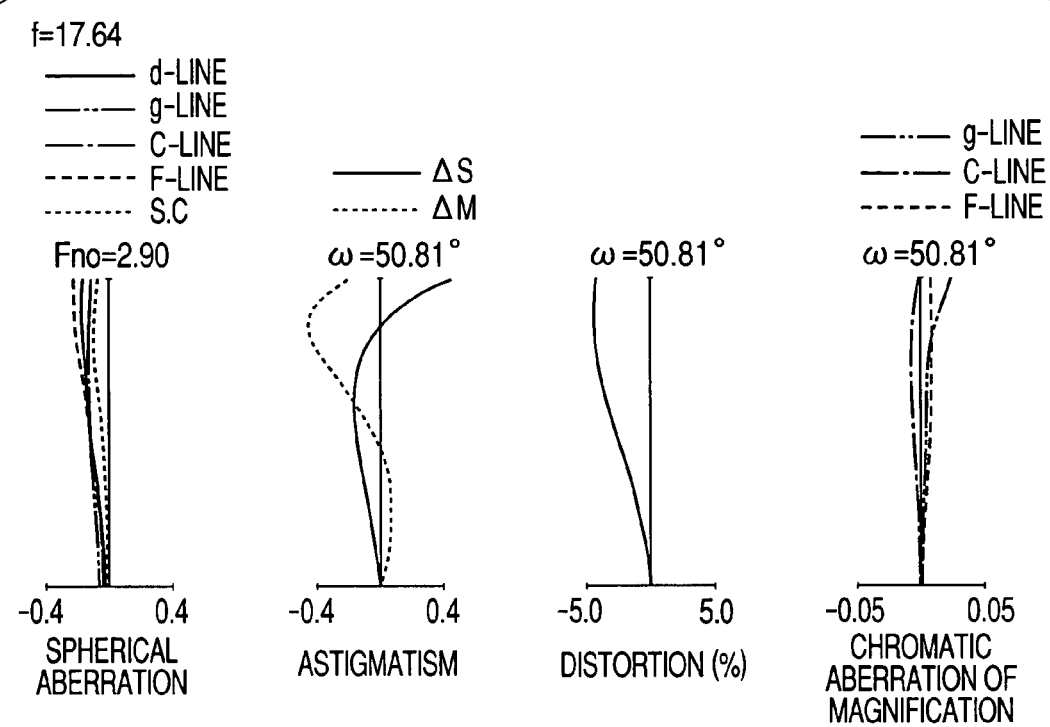
Figure 8B:
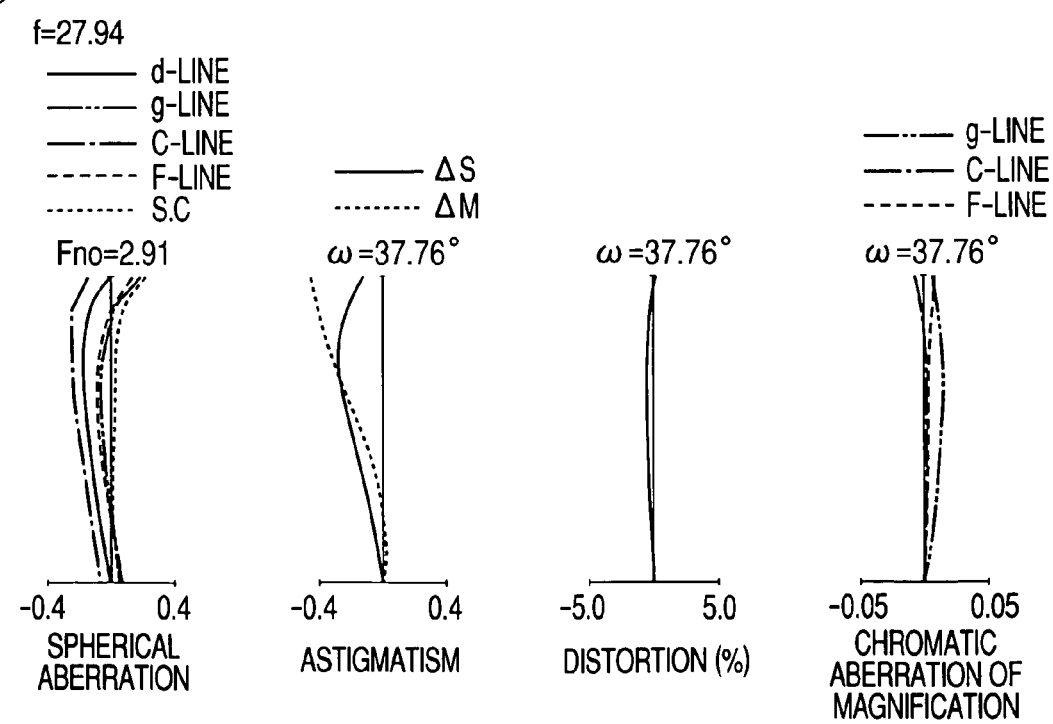
Figure 9:
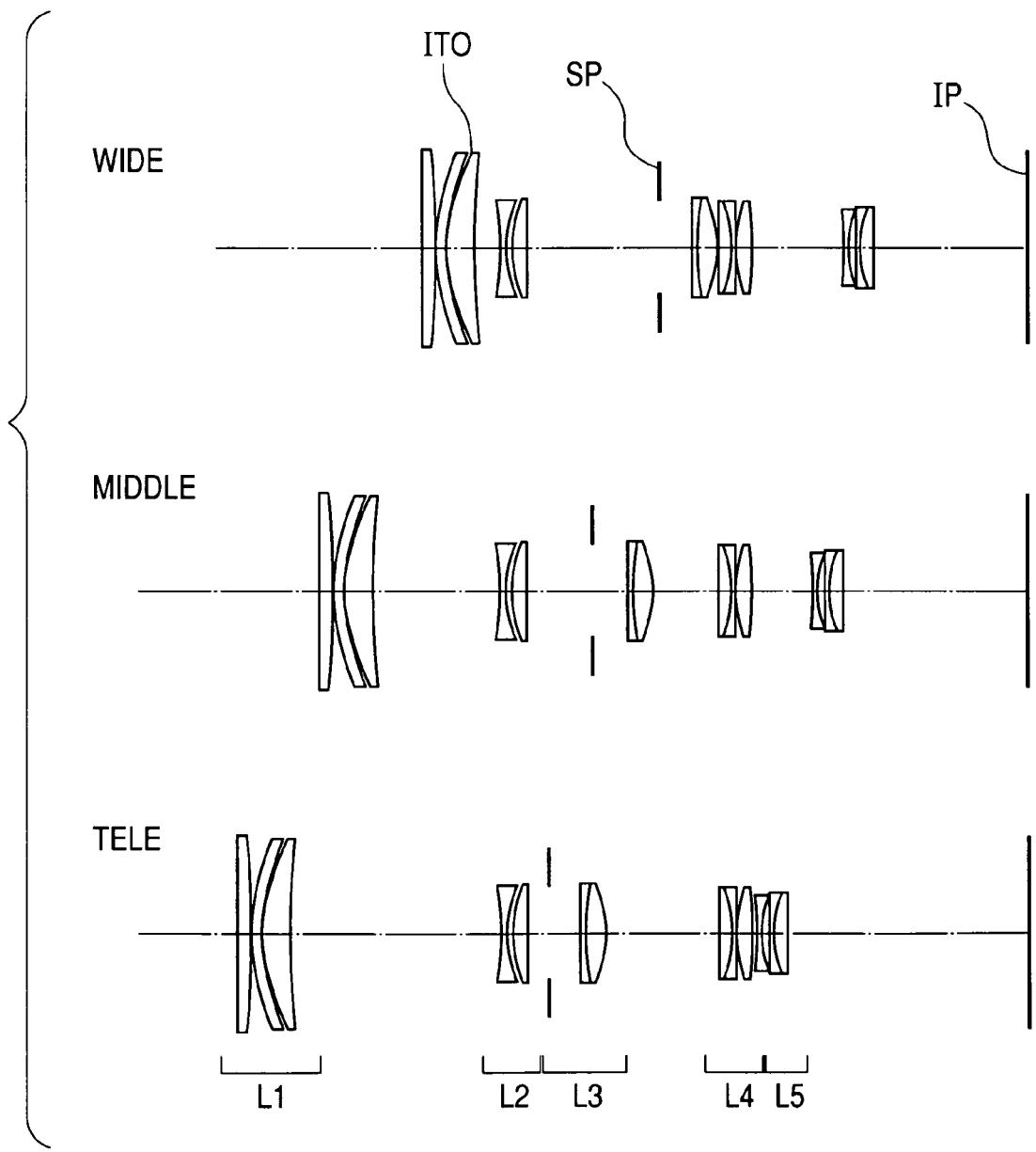
FIG. 9 is a lens sectional view showing an optical system according to Embodiment 5 of the present invention.
Figure 10A:
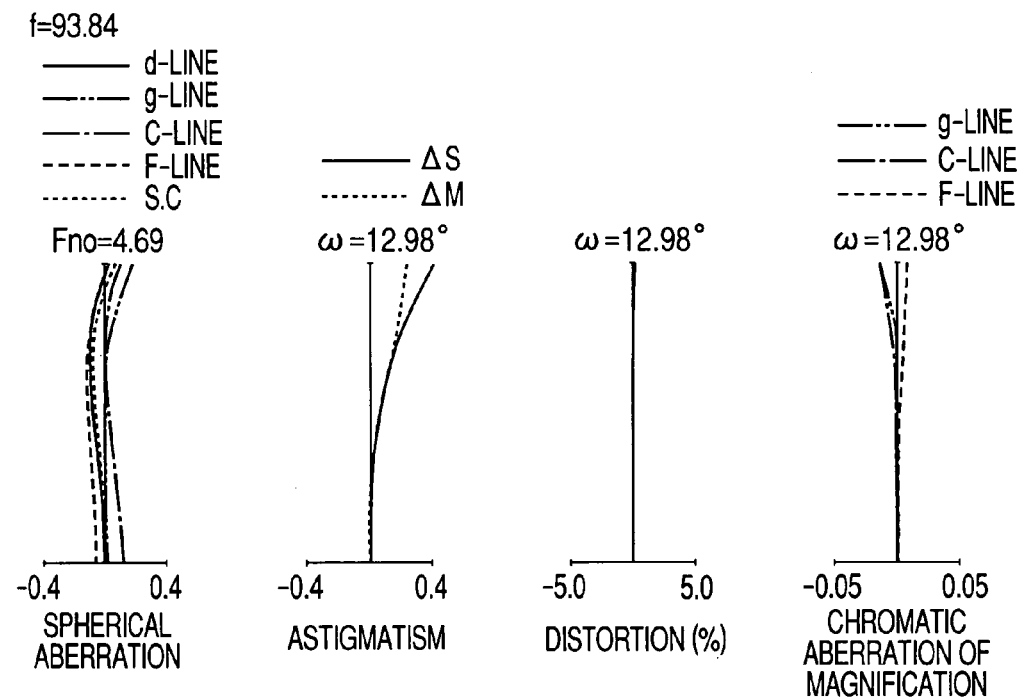
FIGS. 10A, 10B, and 10C are graphs showing various aberrations of the optical system according to Embodiment 5 of the present invention.
Figure 10B:
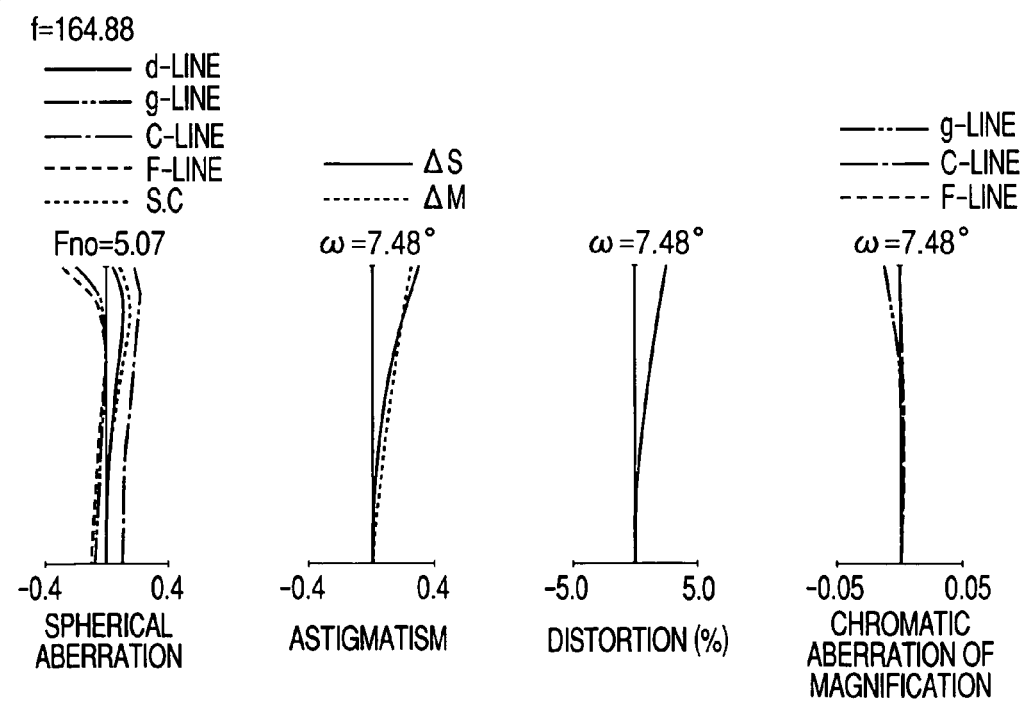
Figure 10C:
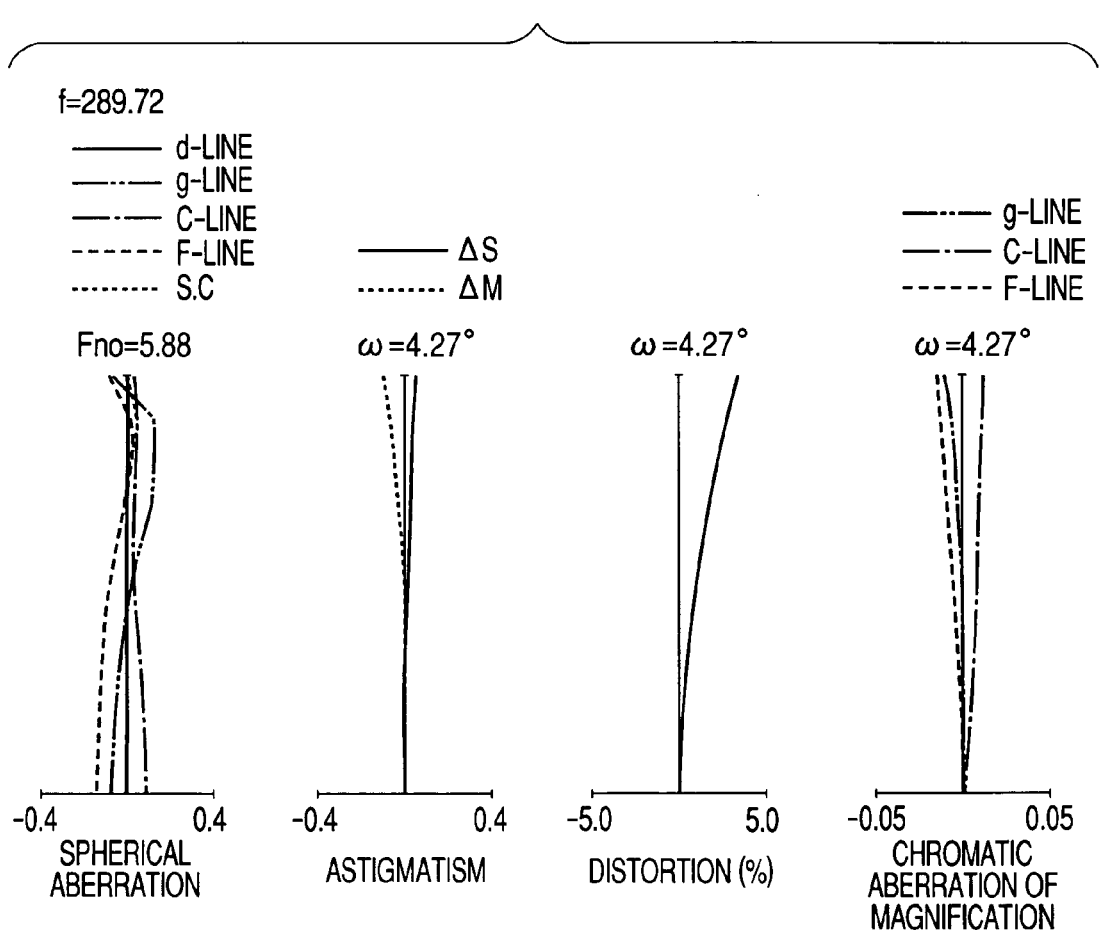
Figure 11:
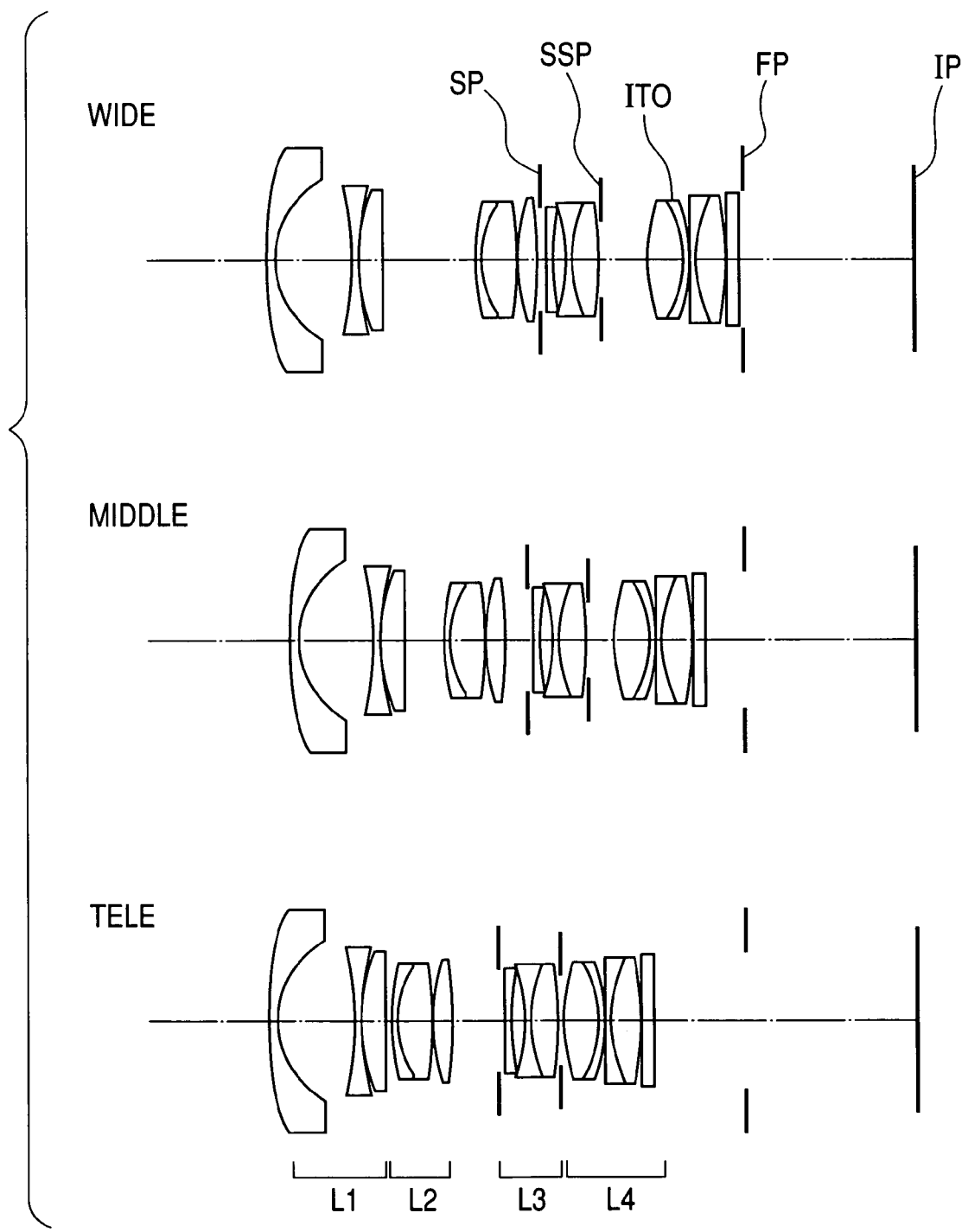
FIG. 11 is a lens sectional view showing an optical system according to Embodiment 6 of the present invention.
Figure 12A:
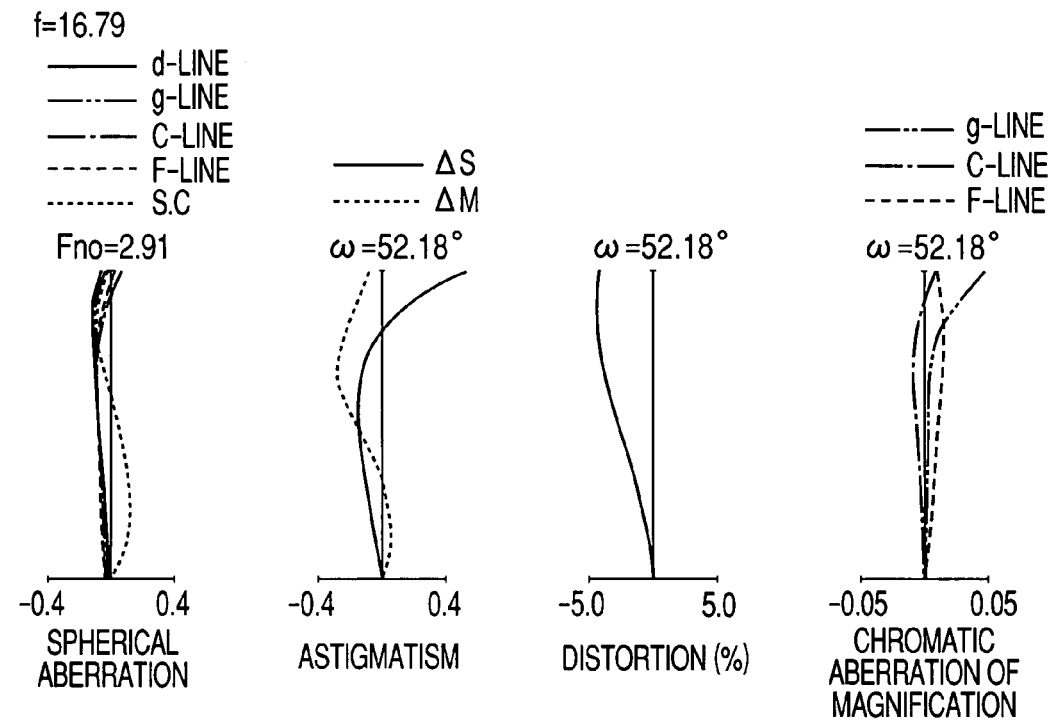
FIGS. 12A, 12B, and 12C are graphs showing various aberrations of the optical system according to Embodiment 6 of the present invention.
Figure 12B:
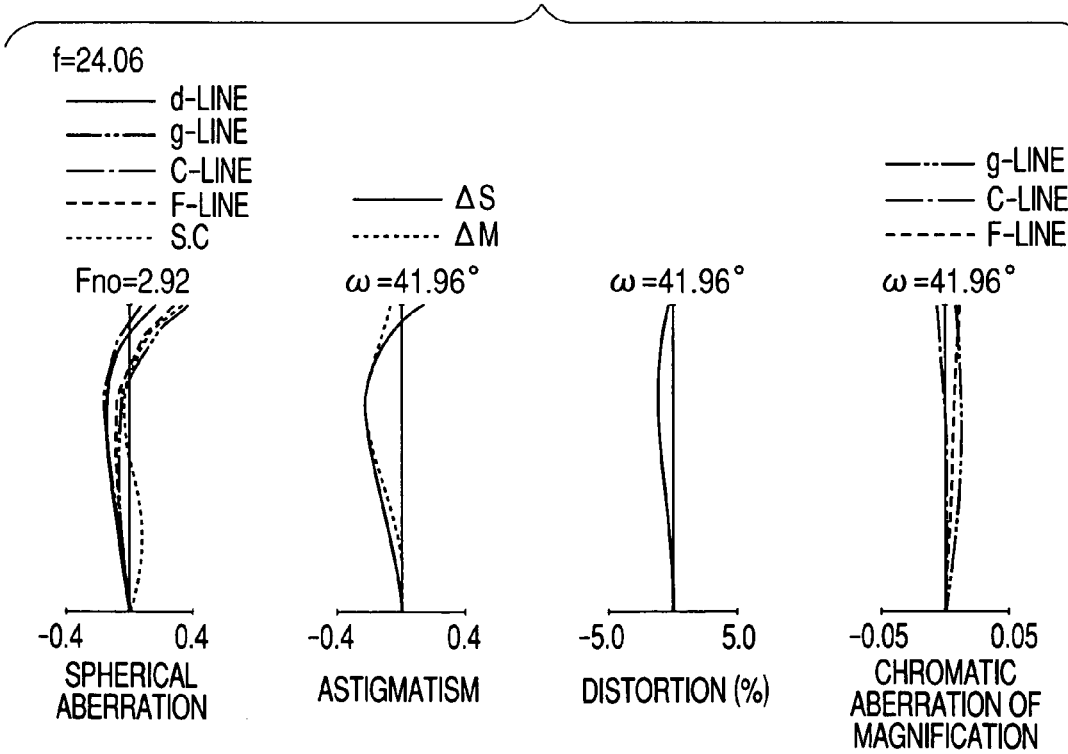
Figure 12C:
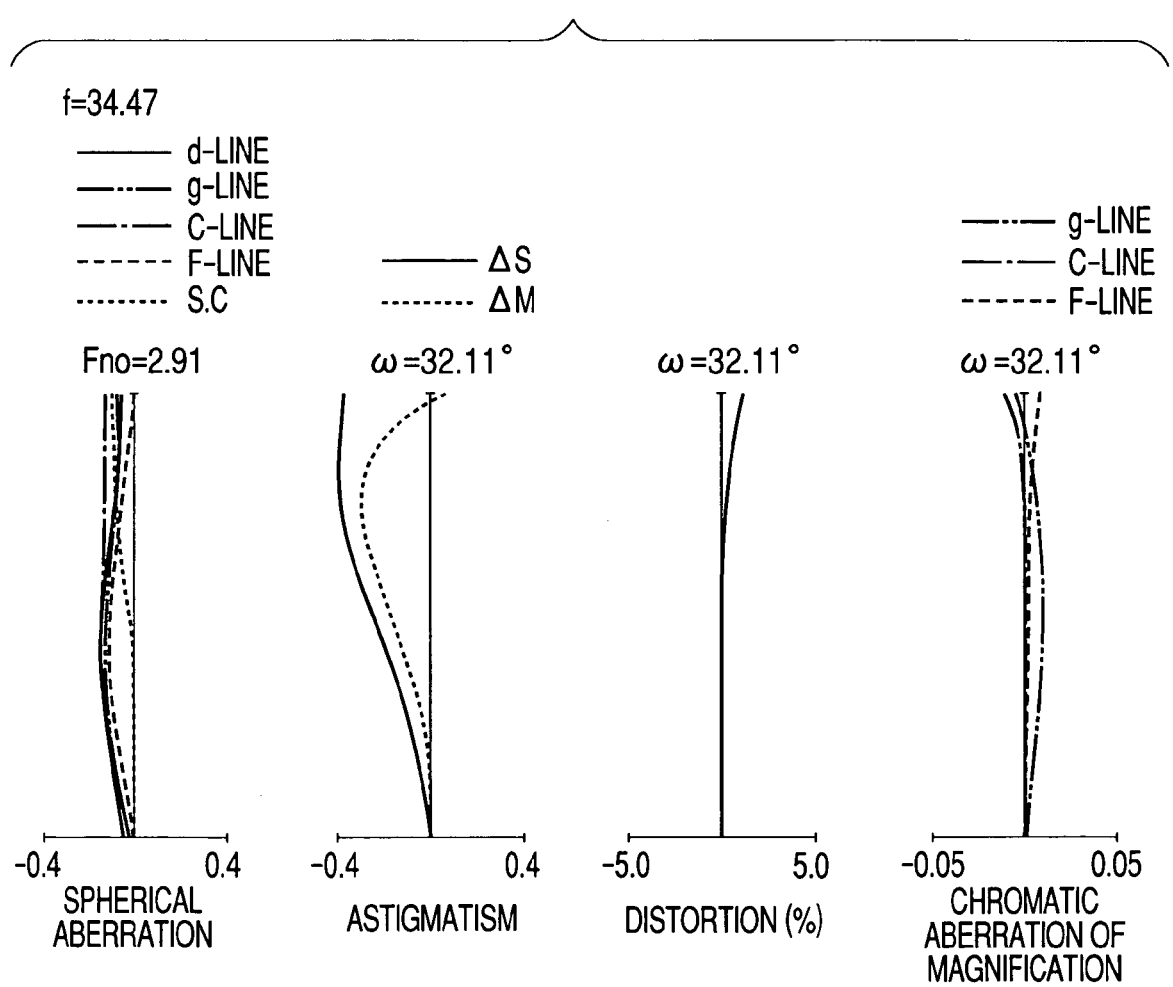

In Embodiment 2 shown in FIG. 3, an adhesive into which the ITO fine particles are mixed is used for the cemented lens of a wide-angle lens. In Embodiment 2, as an adhesive material for the cemented lens which is located closer to an image side than the aperture stop SP and has a positive refractive power, polyvinylcarbazole into which the ITO fine particles are mixed at 20% is used.

Figure 14:
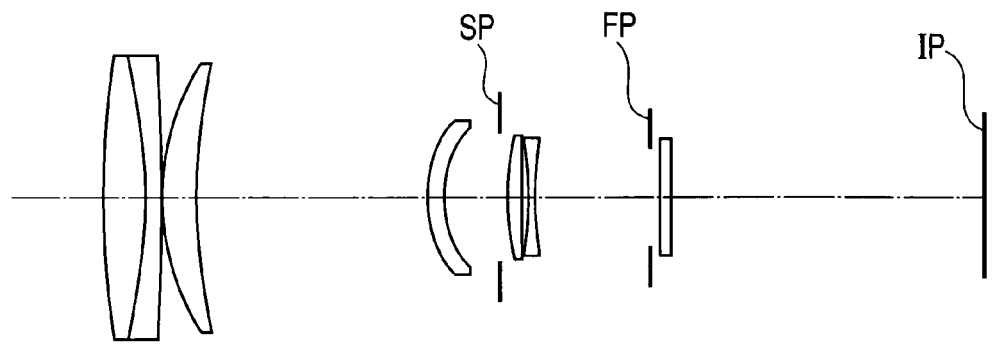
FIG. 14 is a lens sectional view showing an optical system of Comparative example 1.
Figure 15:
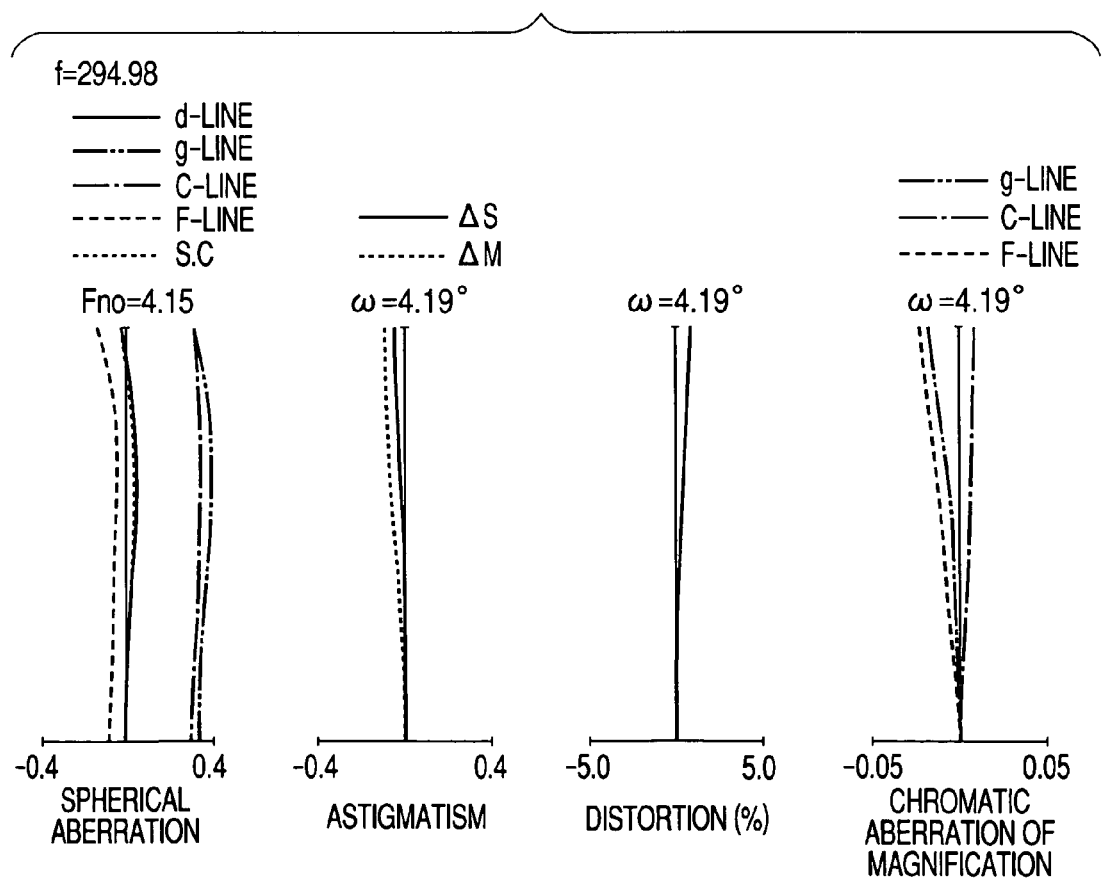
FIG. 15 is a graph showing various aberrations of the optical system of Comparative example 1.
Figure 16:
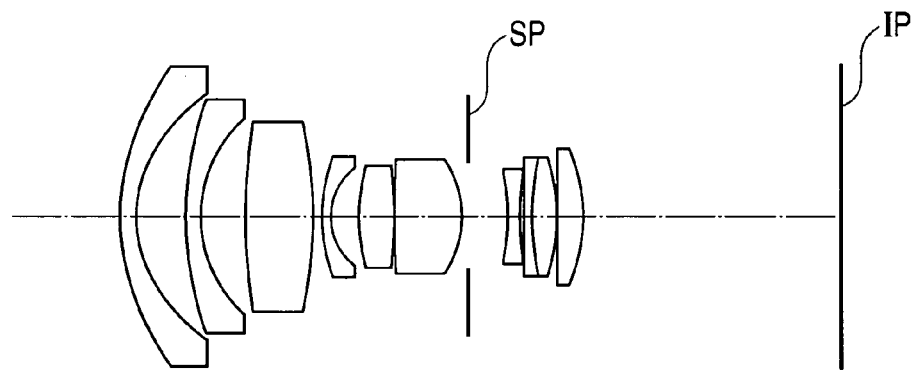
FIG. 16 is a lens sectional view showing an optical system of Comparative Example 2.
Figure 17:
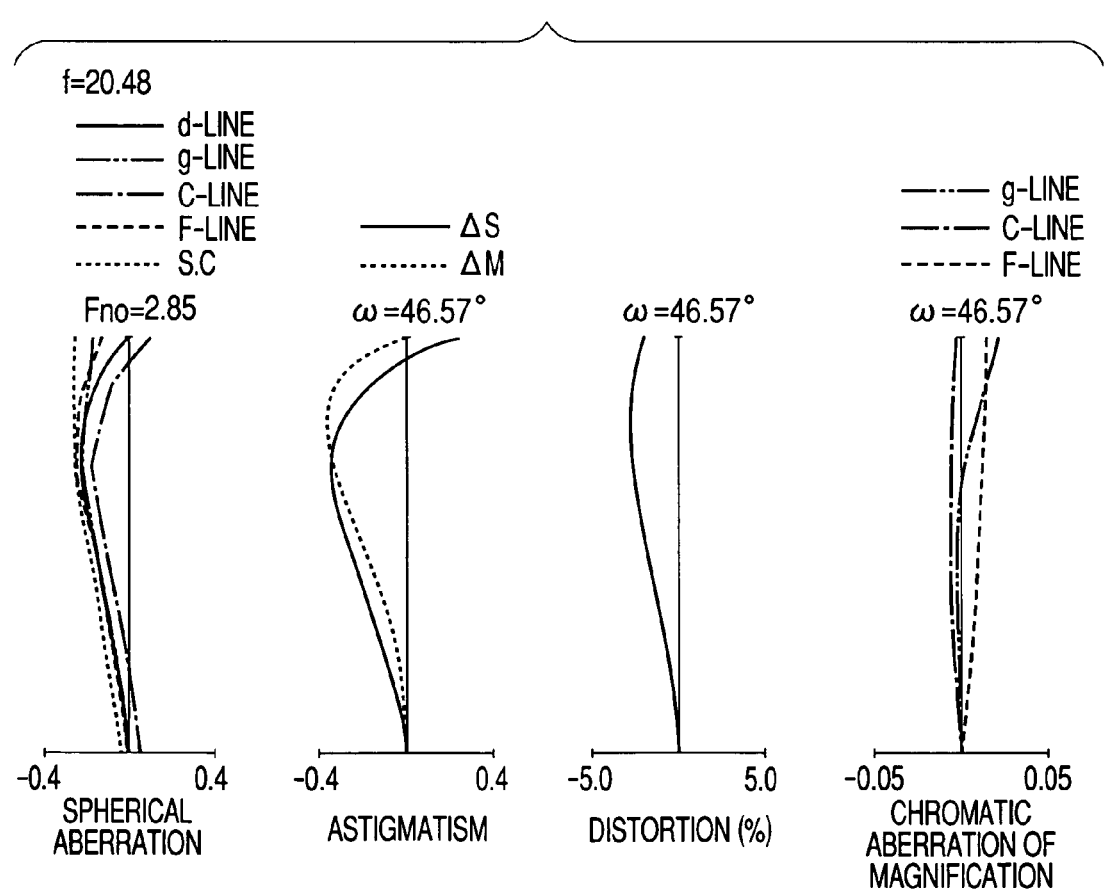
FIG. 17 is a graph showing various aberrations of the optical system of Comparative Example 2.

FIG. 14 is a lens sectional view showing an optical system of Comparative Embodiment 1. Its optical specification is substantially identical to that of the optical system according to Embodiment 1 except that an inorganic fine particle mixture is not used for the adhesive layer. FIG. 15 is a graph showing various aberrations of the optical system of Comparative Embodiment 1. FIG. 16 is a lens sectional view showing an optical system of Comparative Embodiment 2. Its optical specification is substantially identical to that of the optical system according to Embodiment 2 except that the inorganic fine particle mixture is not used for the adhesive layer. FIG. 17 is a graph showing various aberrations of the optical system of Comparative Embodiment 2. As comparing various aberrations of the optical systems according to Embodiments 1 and 2 with those of Comparative Embodiments 1 and 2, the chromatic aberration correcting effect of each of the optical systems according to Embodiments 1 and 2 is apparent.

Each of Embodiments 3 and 5 shows a telephoto zoom lens. This zoom lens includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power, in order from the object side to the image side. An adhesive into which the ITO fine particles are mixed is used for the cemented lens of the zoom lens. In those embodiments, as an adhesive material for the cemented lens which is located in the first lens unit L1 and has a positive refractive power, polyvinylcarbazole into which the ITO fine particles are mixed at 15% is used. Therefore, without using a special glass material, axial chromatic aberration at a telephoto end, which is caused particularly in the case where telephotographing is improved, is preferably corrected.

Each of Embodiments 4 and 6 shows a wide-angle zoom lens. This zoom lens includes a first lens unit L1 having a negative refractive power, a second lens unit L2 having a positive refractive power, a third lens unit L3 having a negative refractive power, and a fourth lens unit L4 having a positive refractive power, in order from the object side to the image side. An adhesive into which the ITO fine particles are mixed is used for the cemented lens of the zoom lens. In those embodiments, as an adhesive material for the cemented lens which is located closest to the object side and has a positive refractive power, polyvinylcarbazole into which the ITO fine particles are mixed at 20% or 15% is used. Therefore, without using a special glass material, chromatic aberration of magnification at a wide-angle end, which is caused particularly in the case where a wide angle is realized, is preferably corrected.

Note that an effect obtained by the present invention is not limited to only the cases of the above-mentioned optical systems. In particular, when the inorganic fine particle dispersion material is used for the cemented lens disposed closer to the object side than the aperture stop SP in the telephoto optical system or when the inorganic fine particle dispersion material is used for the cemented lens disposed closer to the image side than the aperture stop SP in the wide-angle optical system, the same effect is obtained.

Each of the optical systems according to Embodiments 1 to 6 is assumed to be the interchangeable lens for single-lens reflex camera. However, applications of the present invention are not limited to this. By applying the present invention, for example, to a telescope, a pair of binoculars, and a microscope, each including an imaging optical system, a preferable chromatic aberration correcting effect is obtained. Therefore, it is possible to realize an optical system for obtaining a high quality image.

Hereinafter, numerical data in Numerical Embodiments 1 to 6 corresponding to Embodiments 1 to 6 and Comparative Embodiment 1 and 2 will be shown. In the respective numerical embodiments, "i" denotes an order counted from the object side, Ri denotes a curvature radius of an i-th optical surface (i-th surface), Di denotes an axial interval between the i-th surface and an (i+1)-th surface, Ni denotes a refractive index of a material of an i-th optical member (other than the adhesive layer in the present invention) based on the d-line, and vi denotes an Abbe number of the material of the i-th optical member (other than the adhesive layer in the present invention) based on the d-line. NITO and vITO denote a refractive index of an adhesive serving as the inorganic fine particle dispersion material based on the d-line and an Abbe number thereof, respectively. In addition, f denotes a focal length, Fno denotes the F number, and ω denotes the half view angle.

Assume that a displacement amount from a surface vertex in the optical axis direction is given by x, a height from the optical axis in a direction perpendicular to the optical axis is given by h, a paraxial curvature radius is given by r, a conic constant is given by k, and aspherical coefficients at respective orders are given by B, C, D, and E. In this case, an aspherical shape can be expressed by the following expression.

$$x(h) = \frac{(1/r)h^2}{1 + \sqrt{\{1-(h/r)^2\}}} + Ah^2 + Bh^4 + Ch^6 + Dh^8 + Eh^{10}$$

Note that "e±XX" in each of the aspherical coefficients indicates "×10^{±XX}".

Table 1 shows relationships between the conditional expressions (1) to (3) and the respective numeral embodiments.

| Numeral Embodiment 1 | | | |
|---|---|---|---|
| f = 295.81 Fno = 4.5 2ω = 8.4° | | | |
| R1 = 179.072 | D1 = 10.00 | N1 = 1.487490 | ν1 = 70.2 |
| R2 = −406.734 | D2 = 0.10 | NITO = 1.712700 | νITO = 13.84 |
| R3 = −1417.187 | D3 = 4.00 | N2 = 1.721507 | ν2 = 29.2 |
| R4 = 1622.901 | D4 = 0.15 | | |
| R5 = 73.881 | D5 = 9.10 | N3 = 1.487490 | ν3 = 70.2 |
| R6 = 201.333 | D6 = 54.82 | | |
| R7 = 47.371 | D7 = 4.43 | N4 = 1.589130 | ν4 = 61.2 |
| R8 = 47.378 | D8 = 14.82 | | |
| R9 = Stop | D9 = 2.18 | | |
| R10 = 40.490 | D10 = 4.80 | N5 = 1.592701 | ν5 = 35.3 |
| R11 = 230.664 | D11 = 2.00 | | |
| R12 = −427.080 | D12 = 1.70 | N6 = 1.772499 | ν6 = 49.6 |
| R13 = 36.864 | D13 = 30.50 | | |
| R14 = ∞ | D14 = 2.50 | | |
| R15 = ∞ | D15 = 2.00 | N7 = 1.516330 | ν7 = 64.2 |
| R16 = ∞ | | | |

\*NITO, νITO
Polyvinylcarbazole with Nd=1.58306 and νd=17.69 into which the ITO fine particles are mixed at 10% is used as an adhesive material.

| Numerical Embodiment 2 | | | |
|---|---|---|---|
| f = 20.50 Fno = 2.86 2ω = 93.1° | | | |
| R1 = 43.585 | D1 = 2.00 | N1 = 1.589130 | ν1 = 61.2 |
| R2 = 20.744 | D2 = 6.87 | | |
| R3 = 54.273 | D3 = 2.00 | N2 = 1.559625 | ν2 = 61.2 |
| R4 = 23.026 | D4 = 6.05 | | |
| R5 = 87.546 | D5 = 9.03 | N3 = 1.589130 | ν3 = 61.2 |
| R6 = −62.508 | D6 = 1.50 | | |
| R7 = 22.690 | D7 = 1.05 | N4 = 1.772499 | ν4 = 49.6 |
| R8 = 10.276 | D8 = 3.86 | | |
| R9 = 46.750 | D9 = 7.14 | N5 = 1.805177 | ν5 = 25.4 |
| R10 = −1963.864 | D10 = 0.10 | | |
| R11 = 59.120 | D11 = 9.06 | N6 = 1.516330 | ν6 = 64.2 |
| R12 = −15.275 | D12 = 0.50 | | |
| R13 = Stop | D13 = 5.60 | | |
| R14 = −27.617 | D14 = 1.90 | N7 = 1.672700 | ν7 = 32.1 |
| R15 = 31.694 | D15 = 0.80 | | |
| R16 = −204.218 | D16 = 1.70 | N8 = 1.805177 | ν8 = 25.4 |
| R17 = −67.770 | D17 = 0.10 | NITO = 1.729340 | νITO = 11.51 |
| R18 = −296.207 | D18 = 3.30 | N9 = 1.487490 | ν9 = 70.2 |
| R19 = −16.237 | D19 = 0.10 | | |
| R20 = −127.852 | D20 = 3.06 | N10 = 1.772499 | ν10 = 49.6 |
| R21 = −33.513 | | | |

\*NITO, νITO
Polyvinylcarbazole with Nd=1.58306 and νd=17.69 into which the ITO fine particles are mixed at 20% is used as an adhesive material.

| Numerical Embodiment 3 | | | |
|---|---|---|---|
| f = 103.35–291.85 Fno = 4.65–5.81 2ω = 23.6–8.5° | | | |
| R1 = 137.517 | D1 = 2.70 | N1 = 1.805181 | ν1 = 25.4 |
| R2 = 110.315 | D2 = 0.10 | NITO = 1.721040 | νITO = 12.55 |
| R3 = 94.141 | D3 = 7.40 | N2 = 1.516330 | ν2 = 64.2 |
| R4 = −241.704 | D4 = 0.20 | | |
| R5 = 63.269 | D5 = 4.40 | N3 = 1.487490 | ν3 = 70.2 |
| R6 = 125.749 | D6 = Variable | | |
| R7 = −70.692 | D7 = 1.40 | N4 = 1.834807 | ν4 = 42.7 |
| R8 = 37.864 | D8 = 3.60 | | |
| R9 = 46.573 | D9 = 3.50 | N5 = 1.846658 | ν5 = 23.9 |
| R10 = 5731.432 | D10 = Variable | | |
| R11 = Stop | D11 = 5.03 | | |
| R12 = −244.087 | D12 = 1.60 | N6 = 1.846658 | ν6 = 23.9 |
| R13 = 114.052 | D13 = 2.60 | | |
| R14 = 108.677 | D14 = 4.80 | N7 = 1.603112 | ν7 = 60.7 |
| R15 = −44.123 | D15 = Variable | | |
| R16 = 76.581 | D16 = 5.50 | N8 = 1.487490 | ν10 = 70.2 |
| R17 = −41.037 | D17 = 1.80 | N9 = 1.834000 | ν9 = 37.2 |
| R18 = −183.385 | D18 = 0.20 | | |
| R19 = 70.476 | D19 = 3.40 | N10 = 1.607289 | ν10 = 49.2 |
| R20 = −215.479 | D20 = Variable | | |
| R21 = −246.027 | D21 = 1.10 | N11 = 1.834807 | ν11 = 42.7 |
| R22 = 41.908 | D22 = 1.00 | | |
| R23 = 423.592 | D23 = 1.20 | N12 = 1.834807 | ν12 = 42.7 |
| R24 = 23.142 | D24 = 3.20 | N13 = 1.784718 | ν13 = 25.7 |
| R25 = 204.169 | | | |

| Variable | Focal Length | | |
|---|---|---|---|
| Interval | 103.35 | 173.68 | 291.85 |
| D6 | 3.18 | 29.07 | 51.68 |
| D10 | 25.90 | 10.05 | 2.66 |
| D15 | 3.28 | 19.13 | 26.53 |
| D20 | 26.73 | 17.28 | 1.73 |

\*NITO, νITO
Polyvinylcarbazole with Nd=1.58306 and νd=17.69 into which the ITO fine particles are mixed at 15% is used as an adhesive material.

| Numerical Embodiment 4 | | | |
|---|---|---|---|
| f = 17.64–33.86 Fno = 2.90–2.90 2ω = 101.6–65.2° | | | |
| \*R1 = 74.042 | D1 = 2.00 | N1 = 1.772499 | ν1 = 49.6 |
| R2 = 19.524 | D2 = 15.55 | | |
| R3 = −55.808 | D3 = 1.20 | N2 = 1.834807 | ν2 = 42.7 |
| R4 = 113.545 | D4 = 2.17 | | |
| R5 = 257.631 | D5 = 3.15 | N3 = 1.805177 | ν3 = 25.4 |
| R6 = −100.037 | D6 = Variable | | |
| R7 = 82.867 | D7 = 1.00 | N4 = 1.850259 | ν4 = 32.3 |
| R8 = 24.920 | D8 = 4.45 | N5 = 1.487490 | ν5 = 70.2 |
| R9 = −100.042 | D9 = 0.15 | | |
| R10 = 35.338 | D10 = 4.35 | N6 = 1.743997 | ν6 = 44.8 |
| R11 = −74.547 | D11 = Variable | | |
| R12 = Stop | D12 = 2.51 | | |
| R13 = −65.432 | D13 = 1.20 | N7 = 1.882997 | ν7 = 40.8 |
| R14 = 174.379 | D14 = 2.02 | | |
| R15 = −41.620 | D15 = 2.20 | N8 = 1.696797 | ν8 = 55.5 |
| R16 = 26.868 | D16 = 4.20 | N9 = 1.846658 | ν9 = 23.9 |
| R17 = −177.023 | D17 = 1.20 | | |
| R18 = Sub-Stop | D18 = Variable | | |
| R19 = 29.386 | D19 = 3.90 | N10 = 1.487490 | ν10 = 70.2 |
| R20 = 189.676 | D20 = 5.60 | N11 = 1.712995 | ν11 = 53.9 |
| R21 = −30.967 | D21 = 0.10 | NITO = 1.729340 | νNITO = 11.51 |
| R22 = −36.527 | D22 = 1.20 | N12 = 1.846658 | ν12 = 23.9 |
| R23 = −92.513 | D23 = 0.20 | | |
| R24 = 39.346 | D24 = 1.30 | N13 = 1.846660 | ν13 = 23.8 |
| R25 = 24.380 | D25 = 1.60 | | |
| R26 = 39.444 | D26 = 7.50 | N14 = 1.487490 | ν14 = 70.2 |
| R27 = −25.301 | D27 = 2.00 | N15 = 1.814740 | ν15 = 37.0 |
| \*R28 = −290.545 | D28 = Variable | | |
| R29 = Fixed Stop | | | |

| Variable | Focal Length | | |
|---|---|---|---|
| Interval | 17.64 | 27.94 | 33.96 |
| D6 | 19.26 | 4.95 | 1.14 |
| D11 | 0.73 | 6.09 | 8.56 |
| D18 | 8.15 | 2.80 | 0.32 |
| D28 | 0.00 | 11.07 | 17.84 |

Aspherical Coefficients
First Surface
A=0.00000e+00  B=2.98445e−05  C=2.71133e−06
D=2.99707e−08 E=4.94577e−11
Twenty-Eighth Surface
A=−9.65800e−03  B=−8.22804e−06  C=1.73307e−07
D=6.63000e−09 E=5.38334e−11

*NITO, vITO

Polyvinylcarbazole with Nd=1.58306 and vd=17.69 into which the ITO fine particles are mixed at 20% is used as an adhesive material.

Numerical Embodiment 5
f = 93.84–289.72 Fno = 4.68–5.88 2ω = 26.0–8.5°

| | | | |
|---|---|---|---|
| R1 = 391.425 | D1 = 3.75 | N1 = 1.516330 | v1 = 64.1 |
| R2 = −245.160 | D2 = 0.15 | | |
| R3 = 59.937 | D3 = 2.40 | N2 = 1.728250 | v2 = 28.5 |
| R4 = 45.470 | D4 = 0.10 | NITO = 1.721040 | vNITO = 12.55 |
| R5 = 43.258 | D5 = 7.25 | N3 = 1.516330 | v3 = 64.1 |
| R6 = 195.033 | D6 = Variable | | |
| R7 = −77.525 | D7 = 1.30 | N4 = 1.806098 | v4 = 40.9 |
| R8 = 29.090 | D8 = 1.70 | | |
| R9 = 32.990 | D9 = 3.60 | N5 = 1.805181 | v5 = 25.4 |
| R10 = 359.854 | D10 = Variable | | |
| R11 = Stop | D11 = 8.00 | | |
| R12 = 359.312 | D12 = 1.30 | N6 = 1.805181 | v6 = 25.4 |
| R13 = 59.965 | D13 = 4.70 | N7 = 1.517417 | v7 = 52.4 |
| R14 = −37.847 | D14 = Variable | | |
| R15 = 238.772 | D15 = 3.40 | N8 = 1.516330 | v8 = 64.1 |
| R16 = −28.556 | D16 = 1.30 | N9 = 1.800999 | v9 = 35.0 |
| R17 = −167.645 | D17 = 0.15 | | |
| R18 = 46.890 | D18 = 3.25 | N10 = 1.582673 | v10 = 46.4 |
| R19 = −102.145 | D19 = Variable | | |
| R20 = −182.411 | D20 = 1.20 | N11 = 1.712995 | v11 = 53.9 |
| R21 = 36.059 | D21 = 1.84 | | |
| R22 = −351.197 | D22 = 1.20 | N12 = 1.712995 | v12 = 53.9 |
| R23 = 24.217 | D23 = 3.10 | N13 = 1.728250 | v13 = 28.5 |
| R24 = 151.241 | | | |

| Variable | Focal Length | | |
|---|---|---|---|
| Interval | 93.84 | 164.88 | 289.72 |
| D6 | 6.75 | 32.74 | 53.48 |
| D10 | 33.56 | 17.34 | 5.14 |
| D14 | 0.70 | 16.92 | 29.12 |
| D19 | 23.55 | 15.37 | 1.09 |

*NITO, vITO

Polyvinylcarbazole with Nd=1.58306 and vd=17.69 into which the ITO fine particles are mixed at 15% is used as an adhesive material.

Numerical Embodiment 6
f = 16.79–34.47 Fno = 2.91–3.52 2ω = 104.4–64.2°

| | | | |
|---|---|---|---|
| *R1 = 522.818 | D1 = 2.00 | N1 = 1.772499 | v1 = 49.6 |
| R2 = 21.226 | D2 = 17.37 | | |
| R3 = −61.601 | D3 = 1.20 | N2 = 1.834807 | v2 = 42.7 |
| R4 = 45.978 | D4 = 0.17 | N3 = 1.516400 | v3 = 52.2 |
| *R5 = 58.731 | D5 = 0.18 | | |
| R6 = 40.127 | D6 = 5.00 | N4 = 1.846660 | v4 = 23.9 |
| R7 = 2441.634 | D7 = Variable | | |
| R8 = 50.372 | D8 = 1.30 | N5 = 1.805181 | v5 = 25.4 |
| R9 = 23.711 | D9 = 7.87 | N6 = 1.517417 | v6 = 52.4 |
| R10 = −89.453 | D10 = 0.15 | | |
| R11 = 41.300 | D11 = 4.24 | N7 = 1.729157 | v7 = 54.7 |
| R12 = −100.558 | D12 = Variable | | |
| R13 = Stop | D13 = 1.56 | | |
| R14 = 49995.989 | D14 = 1.45 | N8 = 1.882997 | v8 = 40.8 |
| R15 = 66.391 | D15 = 2.87 | | |
| R16 = −32.863 | D16 = 1.50 | N9 = 1.723420 | v9 = 38.0 |
| R17 = 23.085 | D17 = 6.00 | N10 = 1.846660 | v10 = 23.9 |
| R18 = −92.014 | D18 = 0.75 | | |
| R19 = Sub-Stop | D19 = Variable | | |
| R20 = 36.013 | D20 = 7.80 | N11 = 1.496999 | v11 = 81.5 |
| R21 = −23.668 | D21 = 0.10 | NITO = 1.721040 | vITO = 12.55 |
| R22 = −24.724 | D22 = 1.20 | N12 = 1.846660 | v12 = 23.9 |
| R23 = −40.325 | D23 = 0.20 | | |
| R24 = 363.403 | D24 = 1.20 | N13 = 1.834000 | v13 = 37.2 |
| R25 = 26.607 | D25 = 6.65 | N14 = 1.496999 | v14 = 81.5 |
| R26 = −71.448 | D26 = 0.15 | | |
| R27 = 1066.382 | D27 = 3.00 | N15 = 1.727380 | v15 = 40.4 |
| *R28 = −137.682 | D28 = Variable | | |
| R29 = Fixed Stop | | | |

| Variable | Focal Length | | |
|---|---|---|---|
| Interval | 16.79 | 24.06 | 34.47 |
| D7 | 21.29 | 8.78 | 0.82 |
| D12 | 0.84 | 5.50 | 11.14 |
| D19 | 10.50 | 5.84 | 0.20 |
| D28 | 1.00 | 9.08 | 21.17 |

Aspherical Coefficients
First Surface
A=0.00000e+00  B=−3.92333e−05  C=−2.57916e−06
D=−2.01647e−08 E=−3.41640e−11
Fifth Surface
A=0.00000e+00  B=1.24349e−05  C=1.26245e−08
D=−2.64999e−10 E=1.17940e−12
Twenty-Eighth Surface
A=0.00000e+00  B=8.19182e−06  C=8.25745e−09
D=2.25680e−11 E=4.39287e−15

*NITO, vITO

Polyvinylcarbazole with Nd=1.58306 and vd=17.69 into which the ITO fine particles are mixed at 15% is used as an adhesive material.

Comparative Embodiment 1 f=294.98 Fno=4.15 2ω=8.4° f = 294.98 Fno = 4.15 2ω = 8.4°

| | | | |
|---|---|---|---|
| R1 = 216.850 | D1 = 11.00 | N1 = 1.487490 | v1 = 70.2 |
| R2 = −158.341 | D2 = 4.00 | N2 = 1.721507 | v2 = 29.2 |
| R3 = −1489.317 | D3 = 0.15 | | |

-continued f = 294.98 Fno = 4.15 2ω = 8.4°

| R4 = 65.260 | D4 = 9.10 | N3 = 1.487490 | ν3 = 70.2 |
|---|---|---|---|
| R5 = 164.434 | D5 = 59.51 | | |
| R6 = 32.371 | D6 = 4.43 | N4 = 1.589130 | ν4 = 61.2 |
| R7 = 29.906 | D7 = 14.82 | | |
| R8 = Stop | D8 = 2.18 | | |
| R9 = 69.758 | D9 = 3.60 | N5 = 1.592701 | ν5 = 35.3 |
| R10 = −251.155 | D10 = 2.00 | | |
| R11 = −73.122 | D11 = 1.70 | N6 = 1.772499 | ν6 = 49.6 |
| R12 = 91.481 | D12 = 30.50 | | |
| R13 = ∞ | D13 = 2.50 | | |
| R14 = 592.425 | D14 = 2.00 | N7 = 1.516330 | ν7 = 64.2 |
| R15 = ∞ | D15 = 82.00 | | |

Comparative Embodiment 2 f = 20.48 Fno = 2.86 2ω = 93.1°

| R1 = 36.269 | D1 = 2.00 | N1 = 1.589130 | ν1 = 61.2 |
|---|---|---|---|
| R2 = 20.119 | D2 = 6.87 | | |
| R3 = 48.531 | D3 = 2.00 | N2 = 1.559625 | ν2 = 61.2 |
| R4 = 19.727 | D4 = 6.05 | | |
| R5 = 89.373 | D5 = 9.03 | N3 = 1.589130 | ν3 = 61.2 |
| R6 = −61.508 | D6 = 1.50 | | |
| R7 = 24.467 | D7 = 1.05 | N4 = 1.772499 | ν4 = 49.6 |
| R8 = 9.621 | D8 = 3.86 | | |
| R9 = 37.997 | D9 = 4.55 | N5 = 1.805177 | ν5 = 25.4 |
| R10 = 609.940 | D10 = 0.10 | | |
| R11 = 49.940 | D11 = 9.34 | N6 = 1.516330 | ν6 = 64.2 |
| R12 = −13.870 | D12 = 0.50 | | |
| R13 = Stop | D13 = 5.60 | | |
| R14 = −27.617 | D14 = 1.90 | N7 = 1.672700 | ν7 = 32.1 |
| R15 = 31.694 | D15 = 0.61 | | |
| R16 = 2706.860 | D16 = 1.00 | N8 = 1.805177 | ν8 = 25.4 |
| R17 = 43.627 | D17 = 3.58 | N9 = 1.487490 | ν9 = 70.2 |
| R18 = −19.991 | D18 = 0.10 | | |
| R19 = −96.270 | D19 = 3.06 | N10 = 1.772499 | ν10 = 46.9 |
| R20 = −23.120 | D20 = 35.88 | | |

TABLE 1

| | Numeral embodiment | | | | | |
|---|---|---|---|---|---|---|
| | 1 | 2 | 3 | 4 | 5 | 6 |
| Conditional expression (1) | 13.84 | 11.51 | 11.51 | 12.55 | 12.55 | 12.55 |
| Conditional expression (2) | 0.56 | 0.484 | 0.484 | 0.518 | 0.518 | 0.518 |
| Conditional expression (3) | 0.719 | 0.293 | 0.223 | 0.158 | 0.164 | 0.063 |

In the optical systems described in the embodiments, the cemented surface is the spherical surface. When an aspherical surface is introduced to the cemented surface, it is further possible to preferably correct various aberrations such as spherical aberration and distortion.

Next, an example in which the optical system according to the present invention is applied to an image pickup apparatus will be described with reference to FIG. 18.

Figure 18:
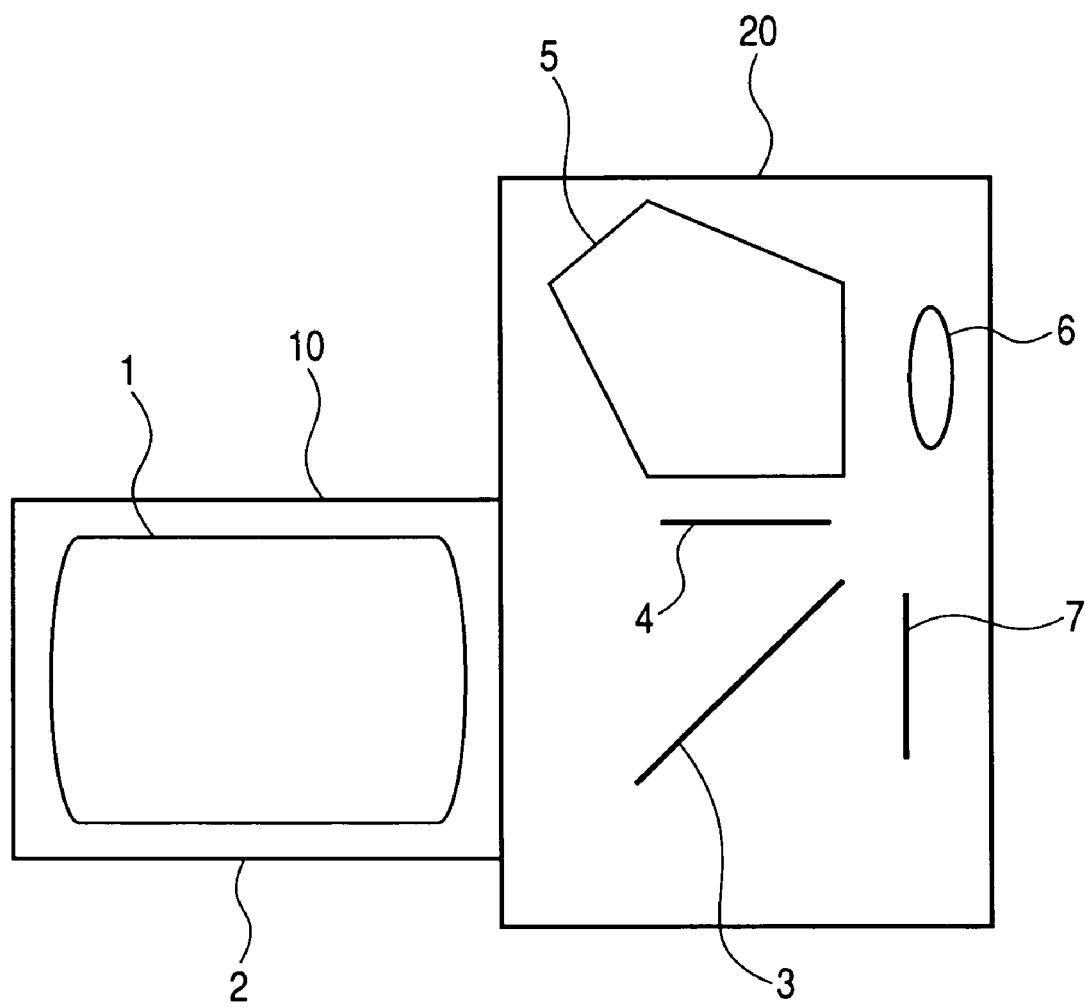
FIG. 18 is a main part schematic view showing an image pickup apparatus.

FIG. 18 is a main part schematic view showing a single-lens reflex camera. In FIG. 18, reference numeral 10 denotes a photographing lens having an optical system 1 according to any one of Embodiments 1 to 6. The optical system 1 is held by a lens barrel 2 serving as a holding member. Reference numeral 20 denotes a camera main body including a quick return mirror 3 for reflecting a light flux from the photographing lens 10 upward, focusing glass 4 located at an image forming position of the photographing lens 10, a penta roof prism 5 for converting an inverted image formed on the focusing glass 4 into an erect image, and an eyepiece 6 for observing the erect image. Reference numeral 7 denotes a photosensitive surface at which a solid-state image pickup element (photoelectric transducer) such as a CCD sensor or CMOS sensor, or a silver-halide film is disposed. At the time of photographing, the quick return mirror 3 is removed from the optical path and an image is formed on the photosensitive surface 7 by the photographing lens 10.

The optical devices as disclosed in the embodiment mode of the present invention effectively benefit from the effects described in Embodiments 1 to 6.

This application claims priority from Japanese Patent Application No. 2004-174057 filed Jun. 11, 2004, which is hereby incorporated by reference herein.

What is claimed is:

1. An optical system, comprising:
a cemented lens having an adhesive layer, between the lens elements of said cemented lens,
wherein the adhesive layer includes a mixture in which inorganic fine particles are dispersed into a transparent medium;
wherein the following conditions are satisfied, $10 < \nu IT < 27$, $0.3 < \theta IT < 0.7$, where νIT represents an Abbe number of the mixture and θIT represents a partial dispersion ratio of the mixture with respect to a g-line and an F-line.

2. An image pickup apparatus, comprising:
the optical system according to claim 1; and
a photoelectric transducer for receiving an image formed by the optical system.

3. An optical system comprising:
a cemented lens having an adhesive layer, between the lens elements of said cemented lens,
wherein the following conditions are satisfied, $10 < \nu IT < 27$, $0.3 < \theta IT < 0.7$, where νIT represents an Abbe number of a material composing the adhesive layer and θIT represents a partial dispersion ratio of the material with respect to a g-line and an F-line.

4. An optical system according to claim 3, wherein the cemented lens has a positive refractive power and the adhesive layer has a negative.

5. An optical system according to claim 3, wherein the cemented lens comprises a lens component having a positive refractive power and a lens component having a negative refractive power.

6. An optical system according to claim 5, wherein the lens component having the negative refractive power has an Abbe number larger than the Abbe number of the adhesive layer.

7. An optical system according to claim 3, wherein the following condition is satisfied, $1 < |Fs/Fit| < 0.04$, where Fit represents a focal length of the adhesive layer and Fs represents a focal length of the cemented lens.

8. An optical system according to claim 3, wherein the optical system forms an image on a photoelectric transducer.

9. An image pickup apparatus, comprising:
the optical system according to claim 3; and a photoelectric transducer for receiving an image formed by the optical system.

10. An optical system, comprising:

a cemented lens having an adhesive layer between the lens elements of said cemented lens, wherein the adhesive layer includes a mixture in which inorganic fine particles are dispersed into a transparent medium;

wherein the cemented lens has a positive refractive power and the adhesive layer has a negative refractive power.

11. An optical system, comprising:

a cemented lens having an adhesive layer between the lens elements of said cemented lens, wherein the adhesive layer includes a mixture in which inorganic fine particles are dispersed into a transparent medium;

wherein the cemented lens comprises a lens component having a positive refractive power and a lens component having a negative refractive power;

wherein the lens component having the negative refractive power has an Abbe number larger than the Abbe number of the mixture.

12. An optical system, comprising:

a cemented lens having an adhesive layer between the lens elements of said cemented lens, wherein the adhesive layer includes a mixture in which inorganic fine particles are dispersed into a transparent medium;

wherein the following condition is satisfied, $1 < |Fs/Fit| < 0.04$, where Fit represents a focal length of the adhesive layer and Fs represents a focal length of the cemented lens.

* * * * *